United States Patent [19]

Epstein

[11] 4,174,358

[45] Nov. 13, 1979

[54] TOUGH THERMOPLASTIC NYLON COMPOSITIONS

[75] Inventor: Bennett N. Epstein, Wilmington, Del.

[73] Assignee: E. I. Du Pont de Nemours and Company, Wilmington, Del.

[21] Appl. No.: 786,201

[22] Filed: Apr. 11, 1977

Related U.S. Application Data

[63] Continuation of Ser. No. 580,513, May 23, 1975, abandoned.

[51] Int. Cl.$^2$ ............................................. C08L 77/00
[52] U.S. Cl. .................................. 525/183; 525/184; 525/425; 525/483; 525/526
[58] Field of Search ............... 260/830 P, 841, 857 R, 260/857 PE, 857 PG, 857 UN, 857 G, 857 L, 857 D, 857 TW, 857, 857 PE, 858

[56] References Cited

U.S. PATENT DOCUMENTS 3,639,502  2/1972  Okazaki ........................... 260/857 R

FOREIGN PATENT DOCUMENTS 998439  7/1965  United Kingdom.
1279836  6/1972  United Kingdom.

OTHER PUBLICATIONS

Modern Plastics Encyclopedia for 1974–1975, vol. 51, No. 10A, Oct. 1974, pp. 551, 552, 558, 559.

*Primary Examiner*—Paul R. Michl

[57] ABSTRACT

Toughened multi-phase thermoplastic composition consisting essentially of one phase containing 60 to 99 percent by weight of a polyamide matrix resin of number average molecular weight of at least 5000, and 1 to 40 percent by weight of at least one other phase containing particles of at least one polymer having a particle size in the range of 0.01 to 3.0 microns and being ahdered to the polyamide, the at least one polymer having a tensile modulus in the range of 1.0 to 20,000 p.s.i., the ratio of the tensile modulus of the polyamide matrix to tensile modulus of said at least one polymer being greater than 10 to 1. Said at least one polymer is either a branched or straight chain polymer. The toughened compositions are useful for making molded and extruded parts. Such parts possess greater ductility, less reduction in toughness from scratches and molded in notches and reduced susceptibility to catastrophic failure when compared to known melt fabricated materials.

55 Claims, No Drawings

TOUGH THERMOPLASTIC NYLON COMPOSITIONS

This is a continuation of application Ser. No. 580,513, filed May 23, 1975, now abandoned.

BACKGROUND OF THE INVENTION

1. Field of the Invention

This invention relates to thermoplastic polyamide compositions, and more particularly to such compositions having improved ductility or toughness, and to the processes for preparing such compositions.

2. Description of the Prior Art

Unmodified thermoplastic polyamides are generally regarded as "tough". For example, the polyamides have good elongation; high energy to break, as demonstrated in tensile tests; high tensile impact strength and high energy absorption as demonstrated in falling dart tests, e.g., the Gardner impact test. In one aspect of toughness the polyamide materials are quite deficient; namely, resistance to crack propagation. This deficiency is reflected in notch sensitivity, brittle breaks and occasional catastrophic failure of molded or extruded parts. The tendency of polyamides to break in a brittle rather than ductile fashion is a significant limitation of utility. A resin may be characterized in its tendency toward ductility by the notched Izod test ASTM D-256-56. With the normal notch radius of 10 mils, polyhexamethylene adipamide (66 nylon), dry as molded, will have a notched Izod value of about 1 ft. lb./inch of notch.

There is much prior art concerned with improving the impact strength of polyamides. A variety of additives have been added to polyamides with some improvement in toughness being obtained. British Pat. No. 998,439, for example, discloses a thermoplastic composition comprising a mixture of 50 to 99 percent linear polyamide and 1 to 50 percent of olefin copolymer particles, the olefin copolymer containing from 0.1 to 10 mole percent of acid groups. Many olefin copolymers are disclosed, but it is not required that the olefin copolymers have a tensile modulus of 20,000 or less. The dry as molded notch sensitivity increases to 4.6 ft. lbs./inch as the copolymer is increased to 40 percent by weight as described in Example 1.

Murch U.S. Pat. No. 3,845,163 discloses blends of 60 to 85 percent by weight polyamide and an acid-containing olefin polymer in which the acid is derived from an α,β-ethylenically unsaturated carboxylic acid and in which at least 10 percent of the acid groups have been neutralized with metal ions. Murch is concerned primarily with weld-line toughness which does not have a specific relation with blend toughness. The Murch blend, however, also demonstrates improvement over the composition of British Pat. No. 998,439 with respect to blend toughness. Murch did not recognize that improved blend toughness of polyamide compositions can be achieved at lower concentration levels of polymer addition provided that at least one polymer present has a tensile modulus of 20,000 or less and the ratio of the tensile modulus of the polyamide to the tensile modulus of said polymer is greater than 10 to 1.

Two U.S. Patents, Kray et al. Nos. 3,388,186 and Seven et al. 3,465,059 disclose polyamide compositions which possess high impact strength, some values being greater than 10 ft. lbs./inch. The disclosed compositions are graft copolymers prepared from an ethylene containing copolymer. The disclosed copolymers do not contain sites which adhere to the polyamide through sites of the polyamide. There is also no recognition that the tensile modulus of the ethylene containing copolymer is no greater than 50,000 p.s.i. or that particle size is important. Furthermore, the Izod impact strength is determined with samples held at 50 percent relative humidity for 3 days prior to testing as disclosed in U.S. Pat. No. 3,388,186. In some compositions moisture causes sharp increases in the notched Izod value. This is shown in Table 1, page 6 of British Pat. No. 998,439.

Owens et al. U.S. Patent 3,668,274 teaches modestly improved impact strength of polycarbonamides modified with (A) a first elastomer phase of copolymers or terpolymers and (B) a final rigid phase thermoplastic stage containing amine-reactive moieties, preferably carboxylic acid groups. The soft modifier is coated with a rigid layer thus negating a large improvement in polyamide toughness that could be achieved with a copolymer modifier.

SUMMARY OF THE INVENTION

According to this invention, there is provided a toughened multi-phase thermoplastic composition consisting essentially of one phase containing 60 to 99 percent by weight of a polyamide matrix resin of number average molecular weight of at least 5000, and 1 to 40 percent by weight of at least one other phase containing particles of at least one polymer taken from the class consisting of branched and straight chain polymers having a particle size in the range of 0.01 to 3.0 microns and being adhered to the polyamide matrix resin, and said at least one polymer having a tensile modulus in the range of about 1.0 to 20,000 p.s.i., the ratio of the tensile modulus of the polyamide matrix resin to tensile modulus of said at least one polymer being greater than 10 to 1.

The term "consisting essentially of" means that in addition to the required polyamide matrix resin and that at least one polymer other components can be present in the toughened composition provided that the basic and essential characteristics of the toughened composition are not materially affected thereby.

The term "branched and straight chain polymers" means that the polymers are not crosslinked to a degree which will increase their modulus to greater than 20,000 p.s.i. or decrease their melt flow to a level which prevents effective dispersion.

According to another aspect of this invention, there is provided a process for the preparation of a toughened multi-phase thermoplastic composition which comprises, in a closed system, (a) admixing (1) 60 to 99 percent by weight of a polyamide matrix resin of number average molecular weight of at least 5000, and (2) 1 to 40 percent by weight of at least one polymer at a temperature in the range of about 5° to 100° C. above the melting point of said polyamide matrix resin and (b) shearing to disperse the polymer in said matrix to a particle size in the range of 0.01 to 3.0 microns, said at least one polymer being adhered to said matrix and having a tensile modulus in the range of 1.0 to 20,000 p.s.i., the ratio of the tensile modulus of said matrix to tensile modulus of said at least one polymer being greater than 10 to 1.

DETAILED DESCRIPTION OF THE INVENTION

The polyamide matrix resin of the toughened compositions of this invention is well known in the art and embraces those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-aminoundecanoic acid, bis(paraaminocyclohexyl) methane dodecanoamide. It is also possible to use in this invention polyamides prepared by the copolymerization of two of the above polymers or terpolymerization of the above polymers or their components, e.g., for example, an adipic, isophthalic acid hexamethylene diamine copolymer. Preferably the polyamides are linear with a melting point in excess of 200° C. As great as 99 percent by weight of the composition can be composed of polyamide; however, preferred compositions contain from 60 to 99 percent, and more narrowly 80 to 95 percent, by weight of polyamide.

The composition is toughened by the combination of at least one polymer with the polyamide. The term "at least one polymer" means one or more polymers which coexist in single discrete particles having a particle size ranging from 0.01 to 3 microns, preferably 0.02 to 1 micron, within the matrix, so that either the mixture of polymers or at least one of the polymers in the mixture meets the following criteria.

(a) sites which adhere to the polyamide matrix;
(b) tensile modulus, as added in the range of about 1.0 to 20,000 p.s.i., preferably about 5 to 20,000 p.s.i., the ratio of tensile modulus of the polyamide matrix resin to tensile modulus of said at least one polymer being greater than 10 to 1, preferably greater than 20 to 1.

The polyamide is the continuous phase in the composition and the polymer performs the function of a soft dispersed phase which is adhered to the polyamide matrix. The polymer may be elastomeric, but it has been found that thermoplastic polymers which are not elastomeric are also effective in the compositions.

The polymers are branched or straight chain and are of such composition that crosslinking other than by reaction with the polyamide matrix is not necessary to their function and excessive crosslinking may, in fact, be harmful.

Branched and straight chain polymers useful as the soft phase of the composition are represented by the formula:

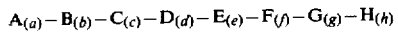

$A_{(a)}-B_{(b)}-C_{(c)}-D_{(d)}-E_{(e)}-F_{(f)}-G_{(g)}-H_{(h)}$ derived in any order, e.g., random, from monomers A to H where A is ethylene;
B is CO;
C is an unsaturated monomer taken from the class consisting of α,β-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;

D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;

G is an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms; and H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

The aforementioned monomers may be present in the polymer in the following mole fraction:
(a) 0 to 0.95;
(b) 0 to 0.3;
(c) 0 to 0.5;
(d) 0 to 0.5;
(e) 0 to 0.5;
(f) 0 to 0.99;
(g) 0 to 0.99; and
(h) 0 to 0.99 so that the total of all components is a mole fraction of 1.0.

Preferably (a) to (h) are present in the following mole fraction:
(a) 0 to 0.9;
(b) 0 to 0.2, most preferably 0.1 to 0.2;
(c) 0.0002 to 0.2, most preferably 0.002 to 0.05;
(d) 0.005 to 0.2, most preferably 0.01 to 0.1;
(e) 0.0002 to 0.1, most preferably 0.002 to 0.01;
(f) 0 to 0.98;
(g) 0 to 0.98; and (h) 0 to 0.98

In place of the aforementioned polymers can be used either:
- I a polyurethane which is the reaction product of at least one glycol taken from the class consisting of polyester glycol having an average molecular weight of 300 to 6,000 and a polyether glycol having an average molecular weight of 300 to 6,000 and optionally at least one diol having a molecular weight of less than 300, and at least one diisocyanate having 4 to 21 carbon atoms; or
- J a polymer containing polyether repeat units taken from the class consisting of the reaction product of epoxide-containing monomers having 2 to 3 carbon atoms, an epoxide-containing monomer having pendant groups taken from the class consisting of methyl or chloromethyl groups, and mixtures of said epoxide monomers.

Each of polymers I or J, when present, replace the polymer containing components A to H. Preferably Polymer I is used with polyamides which melt at temperatures below 200° C. whereas preferably Polymer J is used with polyamides which melt at temperatures below 225° C.

At least one of B, C, D and E is present in all polymeric systems with the exception of I and J. When A is present, in addition to at least one of B, C, D and E being present, at least one of F, G and H is also present. A mixture of two or more polymers can be used with the proviso that at least one of B, C, D and E is present in at least one of the polymers. Since I and J are polymers which contain adherent sites, the presence of B, C, D and E is not necessary.

The polymeric component of the toughened composition may be prepared by standard copolymerization reaction or by a grafting reaction. Thus B, C, D and E may be copolymerized with A, F, G and H and C, D and E may be added by a grafting reaction.

Illustrative of monomers C to H of the above formula are:
- C is maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoethyl ester, monoesters of maleic, fumaric, itaconic acids with R where R is up to 29 carbon atoms, e.g., methyl, propyl, isopropyl, butyl, isobutyl, hexyl, cyclohexyl, octyl, 2-ethyl hexyl, decyl, stearyl, methoxy ethyl, ethoxy ethyl, hydroxy ethyl, etc.
- D is glycidyl methacrylate, glycidyl acrylate, allyl glycidyl ether, vinyl glycidyl ether, glycidyl itaconate, etc.
- E is phthalic anhydride, sulfonyl azide, methyl ester and monooctadecyl ester of phthalic anhydride sulfonyl azide, benzoic acid sulfonyl azide, naphthoic acid sulfonyl azide, naphthoic diacid sulfonyl azide, R-monoesters (and metal salts thereof) of phthalic acid and naphthoic diacid sulfonyl azide, where R is up to 29 carbon atoms, etc.;
- F is methyl methacrylate, butyl acrylate, ethyl acrylate, vinyl acetate, methyl vinyl ether, zinc methacrylate, acrylonitrile, R-esters of acrylic, methacrylic acids; R-vinyl ethers, vinyl benzoate, vinyl naphthoate, vinyl esters of R-acids, where R is up to 18 carbon atoms, vinyl chloride, vinylidene fluoride, etc.;
- G is styrene, propylene, isobutylene, vinyl naphthalene, vinyl pyridine, vinyl pyrrolidone, mono-, di-, trichloro styrene, R'-styrene where R' is 1 to 10 carbon atoms, butene, hexene, octene, decene, etc.; and
- H is hexadiene, norbornadiene, butadiene, isoprene, divinyl, allyl styrene, etc.

Polymer I includes: reaction products of diisocyanates, e.g., 2,4- or 2,6-toluene diisocyanate and mixtures, 4,4'-methylene bis phenyl isocyanate, hexamethylene diisocyanate, 4,4'-methylene bis cyclohexylisocyanate; glycols, e.g., di(betaoxyethyl) ether of hydroquinone, poly(ethylene adipate) glycol, poly(1,4-butylene adipate glycol, polypropylene ether glycol, polytetramethylene ether glycol; diols, e.g., ethylene glycol, 1,4-butanediol, etc. Polymer J includes: ethylene oxide, propylene oxide, epichlorohydrin, etc.

Useful polymers for toughening polyamide compositions are the following alternating or primarily random polymers:
zinc salt of ethylene/isobutyl acrylate/methacrylic acid; ethylene/methyl acrylate/monoethyl ester of maleic anhydride and 0 to 100 percent neutralized zinc, sodium, calcium, lithium, antimony, and potassium salts thereof; ethylene/methyl acrylate/monoethyl ester of maleic anhydride partially neutralized with an amine ended oligomer of caprolactam; mixture of ethylene/isobutyl acrylate/methacrylic acid and ethylene/methyl acrylate/monoethyl ester of maleic anhydride and zinc salts thereof; ethylene/methyl acrylate/methacrylic acid and zinc salts thereof; ethylene/vinyl acetate/methacrylic acid and zinc salts thereof; ethylene/methyl methacrylate/methacrylic acid and zinc salts thereof; ethylene/vinyl acetate/carbon monoxide; mixtures of ethylene/vinyl acetate/carbon monoxide and a zinc salt of ethylene/isobutyl acrylate/methacrylic acid; mixtures of ethylene/vinyl acetate and a zinc salt of ethylene/isobutyl acrylate/methacrylic acid; mixtures of ethylene/isobutyl acrylate and a zinc salt of ethylene/isobutyl acrylate/methacrylic acid; mixtures of ethylene/acrylic acid and ethylene/vinyl acetate; ethylene/isobutyl acrylate/carbon monoxide; ethylene/stearyl methacrylate/carbon monoxide; ethylene/n-butyl acrylate/carbon monoxide; ethylene/2-ethyl hexyl methacrylate/carbon monoxide; ethylene/methyl vinyl ether/carbon monoxide; ethylene/vinyl acetate/maleic anhydride; ethylene/vinyl acetate monoethyl ester of maleic anhydride; ethylene/vinyl acetate/glycidyl methacrylate; ethylene/propylene/1,4 hexadiene-g-maleic anhydride; mixtures of ethylene/propylene/1,4 hexadiene and ethylene/maleic anhydride; ethylene/propylene/norbornadiene/1,4 hexadiene-g-benzoic acid sulfonyl azide; ethylene/propylene/1,4 hexadiene-g-phthalic anhydride sulfonyl azide; mixtures of ethylene/propylene/1,4 hexadiene and ethylene/propylene/1,4 hexadiene-g-maleic anhydride; ethylene/propylene/1,4 hexadiene-g-maleic anhydride neutralized with amine ended oligomer of caprolactam; ethylene/propylene/1,4 hexadiene/maleic anhydride neutralized with zinc rosinate; ethylene/propylene/1,4 hexadiene-g-fumaric acid; ethylene/propylene/1,4 hexadiene/norbornadiene-g-maleic anhydride; ethylene/propylene/1,4 hexadiene/norbornadiene-g-monoethyl ester of maleic anhydride; ethylene/propylene/1,4 hexadiene/norbornadiene-g-fumaric acid; ethylene/propylene/1,4 hexadiene/glycidyl methacrylate; ethylene/propylene/1,4 hexadiene/norbornadiene-g- phthalic anhydride sulfonyl azide; mixtures of ethylene/propylene/1,4 hexadiene and ethylene/monoethyl ester of maleic anhydride; mixtures of ethylene/propylene/1,4 hexadiene and ethylene/butyl hydrogen maleate; mixtures of ethylene/propylene/1,4 hexadiene and ethylene/maleic anhydride, mixtures of butadiene/acrylonitrile and styrene/maleic anhydride; mixtures of styrene/butadiene and ethylene/maleic anhydride; isobutylene/isoprene-g-phthalic anhydride sulfonyl azide; poly(isobutylene)-g-phthalic anhydride sulfonyl azide; mixtures of ethylene/propylene/1,4-hexadiene/norbornadiene and styrene/maleic anhydride; isoprene/phthalic anhydride; mixtures of natural rubber and ethylene/monoethyl ester of maleic anhydride; butyl acrylate/monoethyl ester of fumaric acid; ethyl acrylate/fumaric acid; epichlorohydrin/ethylene oxide; mixtures of ethylene/propylene and ethylene/monoethyl ester of maleic anhydride; ethylene/propylene-g-phthalic anhydride sulfonyl azide; ethylene/propylene/5-ethylidene-2-norbornene-g-fumaric acid, ethylene/propylene/dicyclopentadiene-g-monoethyl ester of maleic acid, ethylene/propylene/5-propenyl-2-norbornene-g-maleic anhydride, ethylene/propylene/tetrahydroindene-g-fumaric acid, ethylene/propylene/1,4-hexadiene/5-ethylidene-2-norbornene-g-fumaric acid.

The improvement in ductility of a composition characterized by a higher notched Izod value is approximately proportional to the concentration of adherent sites in the polymeric component as well as to the melt viscosity which is a measure of the molecular weight, and molecular weight distribution within the limits of effective dispersion. Where high concentrations of adherent sites are utilized, it is generally possible to mix two polymers together, i.e., one as the source of adherent sites, and the other as a diluent. Mixing may be accomplished by combining the polymers with the polyamide separately or in combination with the proviso that the polymer containing the adherent sites must not be combined with the polyamide matrix resin prior to combination of any other polymers. In ethylene/propylene/diene polymers molecular weights equivalent to melt flow of 0.5 to 400 g./10 mins. and more by ASTM D 1238 but at 280° C. and a total load of 2160 g. are effective. In the variety of polymers employed a melt flow range of more than 0.1 to 1,000 may be employed but a range of 0.5 to 100 is preferred.

While not being limited to any theory, it is believed that the soft phase polymer only has to adhere with the polyamide matrix at the interface or surface of the two phases. The mechanism of adhesion is not fully understood and may be achieved by bonds which vary in energy from hydrogen bonding to covalent bonding.

The notched Izod test further characterizes the composition with regard to its ductility. Expressed in ft. lb./inch of notch, notched Izod values in the dry as molded condition for preferred polymers are at least the values represented by the formula:

$B + 0.2\ C_1$, $B + 2.0 + 0.5\ (C_2 - 10)$, $B + 12.0$ where
B is the notched Izod of the polyamide matrix polymer, $C_1$ is 2 to 10 percent by weight of the at least one polymer, and $C_2$ is 10 to 30 percent by weight of the at least one polymer. $B + 12.0$ applies between 30 and 40 percent.

It has been found generally that dry as molded notched Izod values of at least 8 ft. lbs./inch are readily achieved at lower concentration values than is achieved by prior art materials.

The melt flow of the thermoplastic composition is in the range of 0.01 to 200 grams per minute by ASTM D-1238 at 280° C. and 2160 g. load, preferably 0.1 to 150 grams per minute. Since the viscosity is highly shear sensitive the compositions of the invention are well suited for extrusion applications.

It is apparent from the above description that a variety of polymers are effective in toughening polyamides and a substantially large number of combinations are useful. It is therefore not surprising that the limits of effectiveness of some components of the compositions depend on the other components. For example, the lower limit of concentration of an effective adhering site, e.g., maleic anhydride, will probably be lower than a less effective adhering site, e.g., methacrylic acid. Similarly the balance between amine and carboxyl end groups in a matrix will influence the comparative effectiveness of different adherent sites of the at least one polymer. Polymers or polymeric mixtures in the lower modulus range tend to be more effective than those polymers or polymeric mixtures in the higher modulus range and may be useful at lower concentrations of adherent site. The equation describing the relationship between notched Izod and concentration of polymer is applicable only for polymers with an optimum combination of adherence, modulus, and particle size. It is also understood that the mixtures described herein are effective only when the components of the mixture co-exist in the same discrete particles in the polyamide matrix. However, more than one such polymeric mixture can be present in the toughened thermoplastic composition.

The compositions of the invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, plasticizers, etc.

The stabilizers can be incorporated into the composition at any stage in the preparation of the thermoplastic composition. Preferably the stabilizers are included early to preclude the initiation of degradation before the composition can be protected. Such stabilizers must be compatible with the composition.

The oxidative and thermal stabilizers useful in the materials of the present invention include those used in addition polymers generally. They include, for example, up to 1 percent by weight, based on the weight of polyamide of Group I metal halides, e.g., sodium, potassium, lithium with cuprous halides, e.g., chloride, bromide, iodide, hindered phenols, hydroquinones, and varieties of substituted members of those groups and combinations thereof.

The ultraviolet light stabilizers, e.g., up to 2.0 percent, based on the weight of polyamide, can also be those used in addition polymers generally. Examples of ultraviolet light stabilizers include various substituted resorcinols, salicylates, benzotriazoles, benzophenones, and the like.

Suitable lubricants and mold release agents, e.g., up to 1.0 percent, based on the weight of the composition, are stearic acid, stearic alcohol, stearamides; organic dyes such as nigrosine, etc.; pigments, e.g., titanium dioxide, cadmium sulfide, cadmium sulfide selenide, phthalocyanines, ultramarine blue, carbon black, etc.; up to 50 percent, based on the weight of the composition, of fibrous and particulate fillers and reinforcements, e.g., carbon fibers, glass fibers, amorphous silica, asbestos, calcium silicate, aluminum silicate, magnesium carbonate, kaolin, chalk, powdered quartz, mica, feldspar, etc.; nucleating agents, e.g., talc, calcium fluoride, sodium phenyl phosphinate, alumina, and finely divided polytetrafluoroethylene, etc.; plasticizers, up to about 20 percent, based on the weight of the composition, e.g., dioctyl phthalate, dibenzyl phthalate, butyl benzyl phthalate, hydrocarbon oils, N-normal butyl benzene sulfonamide, ortho and para toluene ethyl sulfonamide, etc. The colorants (dyes and pigments) can be present in an amount of up to about 5.0 percent by weight, based on the weight of the composition.

The toughened compositions of this invention can be prepared by melt blending, in a closed system, a polyamide and at least one polymer into a uniform mixture in a multi-screw extruder such as a Werner Pfleiderer extruder having generally 2–5 kneading blocks and at least one reverse pitch to generate high shear, or other conventional plasticating devices such as a Brabender, Banbury mill, or the like. Alternatively, the blends may be made by coprecipitation from solution, blending or by dry mixing together of the components followed by melt fabrication of the dry mixture by extrusion.

The compositions described in the examples are prepared with a Werner Pfleiderer twin screw extruder. The constituents are dry blended and extruded under vacuum 5° to 100° C. above the melting point of the matrix resin, preferably 310° C. or below. Higher temperatures have been used successfully. The extrudate, which is opaque at temperatures less than 20° C. above the melting point, denoting a two phase system, is cooled in a water bath, cut, vacuum dried and molded into test pieces. Of course, many process variations are possible.

It may be desirable to form a concentrate of the toughened thermoplastic composition. This is accomplished by admixing the polyamide in higher concentrations based on the weight of total composition, e.g., up to about 50 percent by weight, with the at least one polymer. Additional polyamide is admixed with the composition to yield the desired concentrate, such as a toughened composition containing 1 to 20 percent by weight of at least one polymer.

It has been found useful to increase the molecular weight of the toughened thermoplastic compositions during the preparation of the composition. By way of illustration, an admixture of low molecular weight polyamide, e.g., 5,000 to 15,000, and at least one polymer is prepared in a plasticating device as described above and the molecular weight is increased either in the melt or at an elevated temperature below the melting point (solid phase) of the polyamide. By way of illustration, after melt blending the composition is either (1) held in the melt at a temperature about 10° to 40° C. above the melting point at a pressure of about 1 to 25 mm Hg absolute for up to one hour, or (2) in the solid phase, after cutting, quenching and drying, at an elevated temperature at least 15° C. below the melt temperature of the polyamide in an inert gas stream for at least two hours. Beaton U.S. Pat. No. 3,821,171 describes solid phase polymerization.

The toughened thermoplastic compositions can be made into a wide range of useful articles by conventional molding methods employed in the fabrication of thermoplastic articles, i.e., as molded parts, extruded shapes, e.g., tubing, films, sheets, fibers and oriented fibers, laminates and wire coating. "Molding" means forming an article by deforming the blend in the heated plastic state.

The compositions of this invention are characterized by an outstanding combination of properties, foremost of which is outstanding toughness properties in view of the quantity of at least one polymer present with the polyamide matrix. The unusually high toughness provides greater ductility, less sensitivity to scratches and molded in notches, and vastly reduced susceptibility to catastrophic failure when compared with previously known compositions in molded parts. Injections molded parts often are of varying thicknesses and may have scratches, molded-in notches of varying radii, and molded in stresses. In addition, orientation effects may cause varied ductility throughout a molded part. The maintenance of high uniform values of notched Izod toughness throughout such molded parts characterizes the improved compositions resistance to brittle breaks. The compositions are of sufficient toughness that the effect of minor changes in processing conditions will not cause significant variations in toughness from lot to lot quantities of composition.

EXAMPLES OF THE INVENTION

The following examples illustrate the invention wherein the percentages are by weight unless indicated.

The toughened polyamide compositions are prepared as follows:

The polyamide matrix and polymer(s) in dry form are mixed after weighing in the proper proportions by tumbling in a polyethylene bag. The mixture is then blended in a 28 mm Werner Pfleiderer extruder in which the hopper is blanketed with nitrogen and the vacuum port maintained at about 25 to 30 inches vacuum. Extruder barrel temperatures are set at about the melting point of the polyamide matrix ($\pm 10°$ C., level condition) yielding melt temperatures in the range of 5° to about 100° C. above the melting point of the matrix.

The beading exiting the extruder is water quenched, cut and vacuum dried overnight at 80° C. prior to molding. Test bars, $\frac{1}{8} \times 5 \times \frac{1}{2}$ inch are molded in 3 oz. and 6 oz. injection molding machines at melt temperatures 10° to 30° C. above the melting point of the polyamide matrix. The mold temperature is about 90° C. with fast injection and a 20/20 or 20/30 molding cycle (seconds ram forward/second hold). The molded bars are tested using the following test procedures in the dry-as-molded state:

Notched Izod toughness: at each end ASTM D-256-56

Tensile Strength: ASTM D-638-58T

Elongation: ASTM D-638-58T

Flexural Modulus: ASTM D-790-58T

Tensile Modulus of the matrices: ASTM D-638-58T (dry)

Tensile Modulus of the polymers: ASTM D-882 (50% RH)

Melt Flow: ATSM D-1238-73 Condition G (except where noted).

Particle Size: Electron micrographs of microtomed or fractured surfaces.

Information relating to the polyamide matrix and polymers used in conjunction with the polyamide matrix are set forth in Tables 1-A and 1-B, respectively. The acronyms used hereinafter are set forth in Table 2.

TABLE 1-A

Polyamide Matrix 1. 66 Polyamide inherent viscosity about 1.25 ± 0.10 measured as 0.5 g. per 100 ml. of m-cresol at 25° C., COOH: 65–73 eq./$10^6$ g.; NH$_2$: 47–53 eq./$10^6$ g.
2. 66 Polyamide inherent viscosity about 0.86 measured as 0.5 g. per 100 ml. of m-cresol at 25° C., COOH: ca 110 eq./$10^6$ g.; NH$_2$: ca 85 eq./$10^6$g.
3. [75] percent 66 Polyamide described in 1 above
   [25] percent 66 Polyamide inherent viscosity about 1.95 ± 0.10 measured as 0.5 g. per 100 ml. of m-cresol at 25° C.
4. [50] percent 66 Polyamide described in 1 above
   [50] percent 66 Polyamide described in 3 above
5. 100 percent 66 Polyamide inherent viscosity about 1.95 ± 0.10 measured as 0.5 g. per 100 ml. of m-cresol at 25° C.
6. 66 Polyamide inherent viscosity about 1.25 ± 0.10 measured as 0.5 g. per 100 ml. of m-cresol at 25° C.; COOH: 34–46 eq./$10^6$g.; NH$_2$: 73–93 eq./$10^6$g.
7. 66 Polyamide inherent viscosity about 0.98 measured as 0.5 g. per 100 ml. of m-cresol at 25° C., COOH: ca 44 eq./$10^6$g.; NH$_2$: ca 94 eq./$10^6$g.

TABLE 1-A-continued

Polyamide Matrix 8. 612 Polyamide inherent viscosity about 0.95 ± 0.10 measured as 0.5 g. per 100 ml. of m-cresol at 25° C.
9. 612 Polyamide inherent viscosity about 1.17 ± 0.10 measured as 0.5 g. per 100 ml. of m-cresol at 25° C.
10. Plaskon ® 8200 - 6 nylon sold by Allied Chemical Co.
11. Huls nylon 12 inherent viscosity about 1.20 measured as 0.5 g. per 100 ml. of m-cresol at 25° C.
12. "Rilsan" nylon 11 inherent viscosity about 1.17 measured as 0.5 g. per 100 ml. of m-cresol at 25° C. sold by Aquitane Chemicals, Inc.
13. 66/6 (80/20)copolymer inherent viscosity about 1.33 measured as 0.5 g per 100 ml. of m-cresol.
14. Trogamid ® T poly(trimethyl hexamethylene terephthalamide) sold by Dynamit Nobel inherent viscosity about 0.95 measured as 0.5 g. per 100 ml. of m-cresol at 25° C., COOH: ca 59 eq./$10^6$g.; NH$_2$: ca 57 eq./$10^6$g.
15. PACM-12 polyamide containing bis(para-aminocyclohexyl) methane and dodecane-dioic acid inherent viscosity about 0.95 measured as 0.5 g. per 100 ml. of m-cresol at 25° C., COOH: ca 57 eq./$10^6$g.; NH$_2$: ca 60 eq./$10^6$g.
16. Plaskon ® 8252 (modified 6 nylon) sold by Allied Chemical Co.

TABLE 1-B

POLYMERS

| Examples | Polymer | Chemical Composition (Weight Ratio) | Melt Flow mas/10 min Before[a] Neutralization | After | % Neut. | Neut. Material | E/IBA/-MAA Method | Temp. °C. | Time min. |
|---|---|---|---|---|---|---|---|---|---|
| 1–12,16 115–8,123 | 1 | E/IBA/MAA 78/12/10 | 35 | ca. 1 | 72 | Zn | | | |
| Control E–G | 2 | E/MAA 90/10 | | ca. 1 | 72 | Zn | | | |
| Control H,I | 3 | F/MA 63/37 | 4.9 | — | | | | | |
| Control J | 4 | E/MA 45/55 | 1.8 | — | | | | | |
| 13[a] | 5 | E/MA/MAME 42/54/4 | 4.0 | | 100 | Zn(OAc)$_2$ | | | |
| 14,15,17–22,36 | 5 | E/MA/MAME 42/52/4 | 4.0 | — | | | | | |
| 23 | 5 | E/MA/MAME 42/54/4 | 4 | | 12 | HMD | 6" mill | 170 | 20 |
| 24[a] | 5 | E/MA/MAME 42/54/4 | 4 | 0.17 | 100 | Zn(OAc)$_2$ | 6" mill | 170 | 18 |
| 25[a] | 5 | E/MA/MAME 42/54/4 | 4 | 0.14 | 100 | Zn(OAc)$_2$ | 6" mill | 170 | 13 |
| 26[a] | 5 | E/MA/MAME 42/54/4 | 4 | 0.41 | 50 | Zn(OAc)$_2$ | 6" mill | 170 | 13 |
| 27 | 5 | E/MA/MAME 42/54/4 | 4 | 16.2 | 25 | 7.5 DP olig. | 6" mill | 225 | 20 |
| 28 | 1 | E/IRA/MAA 78/12/10 | 35 | | — | | | | |
| 29 | 1 | E/IBA/MAA 78/12/10 | 35 | | 25 | Zn(OAc)$_2$ | 6" mill | 170 | 20 |
| 30 | 1 | E/IBA/MAA 78/12/10 | 35 | | 50 | Zn(OAc)$_2$ | 6" mill | 170 | 20 |
| 31 | 1 | E/IBA/MAA 78/12/10 | 35 | | 71 | Zno conc. | extruder | 280 | 3 |
| 32 | 1 | E/IBA/MAA 78/12/10 | 35 | | 100 | Zn(OAc)$_2$ | 6" mill | 170 | 20 |
| 33 | 1A | E/IBA/MAA 74/20/6 | 41 | 39.4 | 50 | Zn(OAc)$_2$ | 6" mill | 150 | 20 |
| 34 | 1A | E/IBA/MAA 74/20/6 | 41 | 12.4 | 75 | Zn(OAc)$_2$ | 6" mill | 150 | 10 |
| 35 | 1A | E/18A/MAA | 41 | 3.2 | 100 | Zn(OAc$_2$ | 6" mill | 150 | 15 |
| Control K | 1A | E/IBA/MAA | 41 | 0.8 | 125 | Zn(OAc)$_2$ | 6" mill | 150 | 20 |

TABLE 1-B-continued

| | | | POLYMERS | | | | | | |
|---|---|---|---|---|---|---|---|---|---|
| | | | Melt Flow mas/10 min | | Neutralization Data | | | | |
| | | Chemical Composition | Before[a] | After | | Neut. | E/IBA/-MAA | Temp. | Time |
| Examples | Polymer | (Weight Ratio) | Neutralization | | % Neut. | Material | Method | °C. | min. |
| 36 | 5 | E/MA/MAME 42/54/4 | 4 | — | 0 | — | — | — | — |
| 37 | 5 | E/MA/MAME 42/54/4 | 4 | 3.4 | 10 | Zn(OAc)$_2$ | 6" mill | 170 | 20 |
| 38 | 5 | E/MA/MAME 42/54/4 | 4 | 0.6 | 25 | Zn(OAc)$_2$ | 6" mill | 170 | 20 |
| 39 | 5 | E/MA/MAME 42/54/4 | 4 | 0.2 | 50 | Zn(OAc)$_2$ | 6" mill | 170 | 15 |
| 40 | 5 | E/MA/MAME 42/54/4 | 4 | 0.08 | 75 | Zn(OAc)$_2$ | 6" mill | 170 | 10 |
| 41 | 5 | E/MA/MAME 42/54/4 | 4 | 0.04 | 100 | Zn(OAc)$_2$ | 6" mill | 170 | 10 |
| Control L | 5 | E/MA/MAME 42/54/4 | 4 | 0.02 | 125 | Zn(OAc)$_2$ | 6" mill | 170 | 7 |
| 42 | 5 | E/MA/MAME 4 42/54/4 | — | — | — | — | — | — | — |
| 43[a] | 5 | E/MA/MAME 42/54/4 | 7.1 | 0.18 | 100 | LiOAc | 6" mill | 150 | 15 |
| 44[a] | 5 | E/MA/MAME 42/54/4 | 7.1 | 2.44 | 100 | KOH | 6" mill | 150 | 15 |
| 45[a] | 5 | E/MA/MAME 42/54/4 | 4 | | 100 | NaOH | 6" mill | — | — |
| 46[a] | 5 | E/MA/MAME 42/54/4 | 5.5 | 18.64 | 100 | Sb$_2$O$_3$ | 6" mill | 150 | 15 |
| 47[a] | 5 | E/MA/MAME 42/54/4 | 7.6 | 41.5 | ≈20 | K stearate | 6" mill | 80 | 10 |
| 48[a] | 5 | E/MA/MAME 42/54/4 | 3.4 | | — | Zn rosinate | — | — | — |
| 49[a] and 50[a] | 1 5 | (See 1) (See 5) | 3.4 | 0 | 100 | Zn(OAc)$_2$ | 6" mill | 150 | 10 |
| 51 | 5 | | 3.4 | — | — | — | — | — | — |
| 52 | 5 | | — | — | — | — | — | — | — |
| 53 | 5 | | — | — | — | — | — | — | — |
| 54 | 6 | E/IBA/MAA 60/37/3 | 3 | | 75 | Zn(OAc)$_2$ | 6" mill | 150 | 15 |
| 55[a] | 7 | E/MA/MAA 47/48/5 | 13 | | 75 | Zn(OAc)$_2$ | 6" mill | 150 | 5 |
| 56 | 8 | E/MA/MAA 70/25/5 | | | 75 | Zn(OAc)$_2$ | 6" mill | 150 | 15 |
| 57 | 9 | E/VA/MAA 66/29/5 | 102 | | 75 | Zn(OAc)$_2$ | 6" mill | — | — |
| 58[a] | 10 | E/MA/MAA 60/36/4 | | 5.1 | 100 | Ca(OAc)$_2$ | 6" mill | 150 | 15 |
| 59 | 11 | E/MA/MAA 80/10/10 | 29 | 3.34 | 75 | Zn(OAc)$_2$ | 6" mill | 150 | 15 |
| 60 | 11 | E/MA/MAA 80/10/10 | 10 | 0.86 | 75 | Zn(OAc)$_2$ | 6" mill | 150 | 15 |
| 61 | 12 | E/VA/MAA 75/18/7 | 30 | | 75 | Zn(OAc)$_2$ | 1 pass extruder | — | — |
| 62 | 12 | E/VA/MAA 75/18/7 | 30 | 2.2 | 75 | Zn(OAc)$_2$ | 6" mill | 150 | 15 |
| 63 | 13 | E/MMA/MAA 74/20/6 | | | — | | | | |
| 64 | 13 | E/MMA/MAA | 74/20/6 | | 75 | Zn(OAc)$_2$ | 1 pass extruder | | |
| Control M | 14 | E/VA 67/33 | 38–48 | | — | | | | |
| Control N | 15 | E/VA 60/40 | 45–70 | | — | | | | |
| 65,67,68 | 16 | E/VA/CO 66/24/10 | 35 | | — | | | | |
| 66 | 17 | E/VA/CO | 61/28/11 | 25 | — | | | | |
| 69 | 1 | (See 1) | | | | | | | |
| | 18 | E/VA/CO 66/24/10 | — | — | | | | | |
| 70 | 1 | (See 1) | | | | | | | |
| | 19 | E/VA 60/40 | — | — | | | | | |
| 71 | 1 | (See 1) | | | | | | | |
| | 20 | E/IBA | 80/20 | — | — | | | | |
| 72 | 1 | (See 1) | | | | | | | |
| | 21 | E/VA 67/33 | — | — | | | | | |
| 73 | 15 | (See 15) | | | | | | | |
| | 22 | E/AA 80/20 | — | | | | | | |
| 74 | 23 | E/IBA/CO 57/34/9 | — | — | | | | | |
| 75 | 24 | E/SMA/CO 67/20/13 | 5 | | | | | | |
| 76 | 25 | E/nBA/CO 71/19/11 | 30 | | | | | | |
| 77 | 26 | E/2EHMA/CO 57/33/9 | 100 | — | | | | | |
| 78 | 27 | E/MVE/CO 62/23/15 | 345 | | | | | | |
| 79 | 28 | E/VA/MAnh 62/33/5 | 290 | | | | | | |
| 80 | 29 | E/VA/MAME 70/28/2 | 40 | — | | | | | |

TABLE 1-B-continued

POLYMERS

| Examples | Polymer | Chemical Composition (Weight Ratio) | Melt Flow mas/10 min Before[a] Neutralization | After | % Neut. | Neut. Material | E/IBA/-MAA Method | Temp. °C. | Time min. |
|---|---|---|---|---|---|---|---|---|---|
| 81 | 30 | E/VA/GMA 67/28/5 | 37 | — | | | | | |
| 82 | 31 | E/EA/MAME/EDMA 21/76/2/0.2 | — | — | | | | | |
| 83 | 32 | E/P/1,4-hexadiene/2,5-norbornadiene-g-1.7% MAnh 70/23/6.75/0.25 | | | | | | | |
| 84 | 33 | EPDM-A + E/MAnh 89/11 1.7% MAnh in mixture | | | | | | | |
| 85 | 34 | MAME-g-EPDM-C 7% MAME added to extruder | | | | | | | |
| 86 | 35 | BASA-g-EPDM-C 2.2% BASA | | | | | | | |
| 87 | 36 | PASA-g-EPBM-B 1.0% PASA | | | | | | | |
| 88,90 | 37 | MAnh-g-EPDM-B + EPDM-B 0.6% MAnh in blend | | | | | | | |
| 89 | 38 | Caprolactam olig.-g-MAnh-g-EPDm-B, 1.5% MAnh | | | | | | | |
| 91 | 39 | MAME-g-EPDM-E + Zn rosinate, 0.7% MAnh | | | | | | | |
| 92 | 40 | Fa-g-EPDM-D extruded with 2% FA | | | | | | | |
| 93 | 41 | FA-g-EPDM-E 1% FA | | | | | | | |
| 94 | 42 | MAnh-g-EPOM-E 1.1% MAnh | | | | | | | |
| 95 | 43 | MAnh-g-EPDM-E 1.4% MAnh | | | | | | | |
| 96 | 44 | 2% Norbornadiene anhydride-g-EPDM-E (2% added to extruder) | | | | | | | |
| 97 | 45 | 4% Norbornadiene anhydride-g-EPDM-E (4% added to extruder) | | | | | | | |
| 98 | 46 | EPDM-B + E/MAME (92/8) 3% MAME in blend | | | | | | | |
| 99 | 47 | EPDM-3 + E/MAME (91.5/8.5) 1.5% MAME in blend | | | | | | | |
| 100 | 48 | EPDM-B + E/MAME (92/8) 3% MAME in blend | | | | | | | |
| 101 | 49 | EPDM-B + E/BuH Maleate (87/13) 3% BuH Maleate in mixture | | | | | | | |
| 102 | 50 | MAnh-g-EPDM* 1.3% MAnh | | | 100 | Zn(OAc)$_2$ | 6" mill | 150 | 15 |
| 103 | 51 | E/F/1,4-hexadiene/2,5-norbornadiene-g-1.7% MAnh 70/23/6.75/0.25 | | | | | | | |
| 104 | 52 | BAN + S/MAnh 3/1 1% MAnh in mixture | | | | | | | |
| Control O | 53 | BAN | | | | | | | |
| 105 | 54 | SBR + E/MAnh (89/11) 1.1% MAnh in mixture | | | | | | | |
| 106 | 55 | 2% PASA-g-Butyl rubber | | | | | | | |
| 107 | 56 | 2% PASA-g-Isobutylene rubber | | | | | | | |
| 108 | 57 | EPDM-E + SMAnh (5/1) 1.7% MAnh in mixture | | | | | | | |
| 109 | 58 | Isoprene rubber + E/MAME (90/10) 1% MAME in mixture | | | | | | | |
| 110 | 59 | Natural rubber + E/MAME (90/10) 1% MAME in mixture | | | | | | | |
| Control P | 60 | Natural rubber | | | | | | | |
| 111 | 61 | EA/FA 96/4 | | | | | | | |
| Control Q | 62 | EA/FAME/EDMA 95/4/1 | | | | | | | |
| 112 | 63 | nBA/FAME 96/4 | | | | | | | |
| 113 | 64 | EP + E/MAME (90/10) 2% MAME in mixture | | | | | | | |
| 114 | 65 | 1% PASA-g-EP | | | | | | | |
| 115-118 Control R,S | 1 | (See 1) | | | | | | | |
| 119 | 66 | FA-g-EPDM-E ca. 1.4% FA | | | | | | | |
| 120-122 | | E/MA/MAME 43/53/4 | | | 100 | Zn(OAc)$_2$ | | | |
| 123 | 1 | (See 1) | | | | | | | |
| 124 | 68 | Polyurethane elastomer | | | | | | | |
| 125-126, 128, 132,135,137-141, control CC, 152-163 | 66 | FA-g-EPDM-E ca. 1.4% FA | | | | | | | |
| 127 | 69 | ethylene oxide/epichlorohydrin rubber + Fe$_2$O$_3$ (5%) | | | | | | | |
| 129 | 70 | EPDM-B 1% g monoethyl PASA | | | | | | | |
| 130 | 71 | EPDM-B 2% g monooctadecyl PASA | | | | | | | |
| 131,134 | 1 | (See above) | | | | | | | |
| 133,136 | 5 | (See above) | | | | | | | |
| 142 | 22 | | | | | | | | |
| | 72 | E/MA 46/54 | | | | | | | |
| 143 | 66 | | | | | | | | |
| | 73 | EPDM-E | | | | | | | |
| Controls Z,AA, 145,146 | 66 | | | | | | | | |
| 144,147,148 | 74 | Polyethylene | 1.2 | | | | | | |
| 149,Control BB | 66 | | | | | | | | |
| Control DD | 75 | Polyethylene | 1.9 | | | | | | |
| | 76 | FA-g-polyethylene, 0.6% FA | | | | | | | |
| 150 | 77 | FA-g-EPDM-E, 0.5% FA | | | | | | | |
| 151 | 66 | | | | | | | | |
| | 78 | Butadiene rubber | | | | | | | |

*1pph Ethyl 330 (hindered phenol antioxidant)
[a]Contains tris(mixed mono- and di-nonylphenyl)phosphite ["Polyguard"] and 4,4'-bis(α,α'- diphenylamine ["Naugard" 445]
[b]ASTM D 1238 Condition E Polymers 1, 2, 6 to 13, 28 to 31 are prepared as described in Rees U.S. Pat. No. 3,264,272.

Polymer 5 is prepared as described in Greene Belgian Pat. No. 818,609 with the neutralizations using the procedure described in Rees U.S. Pat. No. 3,264,272 with the exception of the HMD neutralization (Example 23) which is described in Rees U.S. Pat. No. 3,471,460.

Polymers 3, 4, 14, 15, 19, 20, 21 are made by high pressure, free radical polymerization, Polymers 16 to 18, 23 to 27 are prepared as described in Hammer U.S. Pat. No. 3,780,140.

Polymer 22 is COMER ® 9300 made by Union Carbide.

Polymers 32, 51 are the indicated base polymer grafted according to Example 13B of Caywood U.S. Ser. No. 322,360, now allowed.

The base polymers of the indicated polymers are as follows:

Polymer 33 ethylene/propylene/1,4-hexadiene (64/32/4) Mooney viscosity ASTM D-1646 (ML-1+4/121° C.) of about 45.

Polymers 34, 35 ethylene/propylene/1,4-hexadiene/2,5-norbornadiene (54/40/6/0.35) Mooney viscosity about 25.

Polymers 36–38, 46–49, 70, 71 ethylene/propylene/1,4-hexadiene (62/32/6) Mooney viscosity about 35.

Polymers 39, 41–45, 50, 57, 66, 73, 77 ethylene/propylene/1,4-hexadiene/2,5-norbornadiene (68/26/6/0.15) Mooney viscosity about 33.

Polymer 40 ethylene/propylene/1,4-hexadiene/ 2,5-norbornadiene (71/23/6/0.5) Mooney viscosity about 25.

All the above base polymers are prepared by copolymerizing the monomers in the presence of a coordination catalyst system such as diisobutylaluminum chloride and vanadium oxytrichloride. Copolymerization may be conducted in an inert solvent or in a slurry or particle form reactor. Details of their preparation are given, for example, in U.S. Pat. Nos. 2,933,480; 2,962,451; 3,000,866; 3,093,620; 3,093,621; 3,063,973; 3,147,230; 3,154,528, 3,260,708; and in M. Sittig, "Stereo Rubber and Other Elastomer Processes", Noyes Development Corportion, Park Ride, N.J., 1967, as well as U.S. Pat. No. 3,819,591.

Polymer 33 is a mixture of the above base polymer and ethylene/maleic anhydride (89/11) made by high pressure, free radical polymerization.

Polymer 34 is tumbled overnight with 7 weight percent of MAME on ¼ inch cubes of base polymer and extruded on a 28 mm Werner Pfleiderer extruder fitted with a vacuum port and 4 kneading blocks. The melt temperature is about 315° C. and hold-up time 2 to 4 minutes. The product is quenched, cut and dried.

Polymer 35 is a mixture of 9.2 grams of m-carboxy benzene sulfonyl azide and 36.0 grams of blanc fixe added to 350 grams of the base polymer and 0.7 gram of 1,3,5-trimethyl-2,4,6-tris(3,5-di-tert-butyl-4-hydroxybenzyl) benzene (Ethyl ® Antioxidant 330) on an unheated rubber roll mill at ambient temperature. Sixty-gram portions of the resulting composition are sheared for 10 minutes at 145° C. and then for 10 minutes at 170° C. in a Brabender plastograph.

Polymer 36 is prepared as follows: A 5-gram portion of phthalic anhydride sulfonyl azide and 5 grams of 1,3,5-trimethyl-2,4,6-tris(3,5-di-tert-butyl-4-hydroxybenzyl) benzene, (Ethyl ® Antioxidant 330) are added to 499 grams of the base polymer on an unheated rubber roll mill at ambient temperature. Sixty-gram portions of the resulting composition are sheared for 10 minutes at 170° C. in a Brabender plastograph.

Polymer 37 is prepared by the procedure described below for polymer 38 using 150 grams of the base polymer of polymer 36 and 120 grams of maleic anhydride. Note: Polymer 37 varies between Examples 88 and 90 as follows: Example 88–40 percent ungrafted, 60 percent grafted-1 percent graft; Example 90–60 percent ungrafted, 40 percent grafted-1.5 percent graft.

Polymer 38 is prepared as follows: A Werner Pfleiderer 53-mm twin screw extruder is assembled by end-to-end attachment of 16 barrel sections of 0.5-inch diameter. Following a short feed section are four reaction sections (zones 1–4), one vacuum extraction section (zone 5), a cooling section (zone 6), and a die section. Provisions are made for the metering of molten maleic anhydride at the forward part of zone 1. The screws are composed of kneading blocks, reverse pitch screws, and transport screws arranged to generate 100–200 p.s.i. pressure in zones 1–4, no pressure in zone 5, and 500–700 p.s.i. die pressure. The free volume of zones 1–5 is equivalent to two pounds of polymer at the operating temperature. Zones 1–4 are preheated to 300° C., zone 5 to 250° C. and zone 6, the cross-head, and the die to 165° C.

The elastomer is fed to the extruder in the form of chips which pass a 0.5-inch screen. Maleic anhydride is metered to the extruder at an average feed rate of 2.1–4.6% of the polymer weight. For every 100 parts of reactants, 6.6 parts of a 1.5% solution of 1,3,5-trimethyl-2,4,6-tris(3,5-di-tert-4-hydroxybenzyl) benzene (Ethyl ® antioxidant 330) in acetone is pumped into a mixing section just ahead of the extraction section. The extruder screw speed is 12.5 rpm and the vacuum section is operated at about 25 inches of Hg.

The product, extruded at the rate of 5.8–6.1 lbs./hr. has a maleic anhydride content of about 1.5% by weight. Four batches totalling 117.0 grams of monoaminoterminated polycaprolactam with an average degree of polymerization of 15.3 are added (as a powder) to four batches of the above product totalling 455.8 grams on a rubber roll mill at 110° C. These mixtures are then transferred to an electrically heated roll mill and formed into a smooth band by milling at 225° C. for 10 minutes.

Polymers 39, 41–45 are prepared by the method of Caywood, U.S. Ser. No. 322,360 but using a variety of unsaturated monomers at peak reaction temperature of 325°–400° C. and using a static mixer such as those marketed by the Kenics Company between the extruder screw(s) and the die.

Polymer 40 is prepared as in Polymer 34 using 2% fumaric acid on the base polymer of Polymer 40. The extruder has 5 kneading blocks and melt temperature was about 350° C.

Polymer 46 is prepared as follows:

A. Ethylene/Ethyl Hydrogen Maleate Copolymer

The random ethylene/ethyl hydrogen maleate copolymer analyzes for 7.2 weight percent incorporated ethyl hydrogen maleate, 0.7 weight percent incorporated maleic anhydride, and 0.4 weight percent incorporated maleic acid made by high pressure free radical polymerization.

B. Blend of Base Polymer and Ethylene/Ethyl Hydrogen Maleate

A blend is prepared by mixing 128 grams of the ethylene/ethyl hydrogen maleate copolymer of A with 192 grams of the base polymer on a rubber roll mill at 150° C. for about 5–10 minutes.

Polymer 47 is prepared as follows:

A. Ethylene/Ethyl Hydrogen Maleate Copolymer

The random ethylene/ethyl hydrogen maleate copolymer analyzes for 7.0 weight percent incorporated ethyl hydrogen maleate, 0.8 weight percent incorporated maleic anhydride, and 0.4 weight percent incorporated maleic acid made by high pressure free radical polymerization.

B. Blend of Base Polymer and Ethylene/Ethyl Hydrogen Maleate

A blend is prepared by mixing 64 grams of the ethylene/ethyl hydrogen maleate copolymer of A with 256 grams of the base polymer on a rubber roll mill at 150° C. for about 5-10 minutes.

Polymer 48 Blend of Base Polymer and Ethylene/Ethyl Hydrogen Maleate Copolymer

The general procedure of Example 99 is repeated using 128 grams of the copolymer and 192 grams of the base polymer.

Polymer 49 is prepared as follows:

A. Ethylene/n-Butyl Hydrogen Maleate Copolymer

The random ethylene/n-butyl hydrogen maleate copolymer analyzes for 11.8 weight percent incorporated n-butyl hydrogen maleate, 1.2 weight percent incorporated maleic anhydride, and 0.3 weight percent incorporated maleic acid made by high pressure free radical polymerization.

B. Blend of Base Polymer and Ethylene/n-Butyl Hydrogen Maleate

A blend is prepared by mixing 64 grams of the ethylene/n-butyl hydrogen maleate copolymer of A with 256 grams of the base polymer on a rubber roll mill at 150° C. for about 5-10 minutes.

Polymer 50 Base polymer grafted by the method of Polymer 39.

Polymer 52 is a mixture of two commercial polymers butadiene/acrylonitrile (BAN) is Firestone FRN 606 and styrene/maleic anhydride made by ARCO SMA-3000, mixed on a 6" roll mill.

Polymer 53 is the BAN described as Polymer 52.

Polymer 54 is a blend of styrene butadiene rubber FRS 211 sold by Firestone and ethylene/maleic anhydride (89/11) made as described in Polymer 33.

Polymer 55 is prepared as follows:

A. Isobutylene/Isoprene Copolymer, Enjay Butyl

The butyl rubber employed is an isobutylene copolymer containing about 2.0 mole percent isoprene units. The Mooney viscosity (ML-1+8/100° C.) is about 45. A nonstaining antioxidant is present, 0.05–0.15% zinc dibutyldithiocarbamate.

B. Phthalic Anhydride Sulfonyl Azide Modified Isobutylene/Isoprene Copolymer

Six grams of phthalic anhydride sulfonyl azide are added to 300 grams of the isobutylene/isoprene copolymer of A on an unheated rubber roll mill at ambient temperature. Grafting is accomplished by heating the resulting composition on a 200° C. mill for 10 minutes.

Polymer 56 is prepared as follows:

A. Polyisobutylene, Enjay Vistanex ® L-80

The polyisobutylene employed has a Staudinger molecular weight of 70,000 and contains a non-staining antioxidant, butylated hydroxytoluene.

B. Phthalic Anhydride Sulfonyl Azide Modified Polyisobutylene

Six grams of phthalic anhydride sulfonyl azide are added to 300 grams of the polyisobutylene of A on an unheated rubber roll mill at ambient temperature. Grafting is accomplished by heating the resulting composition on a 200° C. mill for 10 minutes.

Polymer 57 is a mixture of the base polymer and styrene/maleic anhydride (5/1) Lytron ® 820 made by Monosanto prepared on a 6" roll mill.

Polymer 58 is a mixture of cis-1,4-polyisoprene having a Mooney viscosity (ML-4/100° C.) of about 85, Natsyn ® 410 sold by Goodyear Tire & Rubber Co., and ethylene/maleic anhydride (90/10) copolymer made by high pressure, free radical polymerization.

Polymer 59 is a mixture of natural rubber Hartex ® 20 sold by Firestone and ethylene/maleic anhydride described in Polymer 58.

Polymer 60 is a control of natural rubber used in the blend of Polymer 59.

Polymer 61 is prepared as follows: A one-liter 4-neck round-bottom glass flask is charged at room temperature with 375 ml of water, 300 ml of ethyl acrylate, 12 grams of fumaric acid, 6 ml of a 30% of sodium lauryl sulfate in water, 0.2 gram of sodium hydrosulfite, and 0.1 ml of dodecyl mercaptan. After the resulting mixture has been sparged with nitrogen, it is heated to 60° C. Copolymerization is initiated and maintained for two hours at 60° C. by gradual addition of a 2% solution of tert-butyl hydroperoxide in water from a syringe pump. The emulsion obtained is strained to remove coagulum (35 grams) and then coagulated with acetone. After the copolymer crumbs have been washed with water three times, they are squeezed and dried in a vacuum oven at 80° C. hours. A 245-gram yield of white copolymer is obtained displaying an inherent viscosity of 4.06 deciliters/gram at 30° C. (measured on a solution of 0.1 gram of copolymer in 100 milliliters of chloroform).

Polymer 62 is prepared as follows: A one-liter, four-neck round-bottom glass flask is charged at room temperature with 450 ml of water, 360 ml of ethyl acrylate, 144 grams of ethyl hydrogen fumarate, 3.6 ml of ethylene dimethacrylate, 7.2 ml of 30% sodium lauryl sulfate in water, 0.24 gram of sodium hydrosulfite, and 1.2 ml of dodecylmercaptan. After the resulting mixture has been sparged with nitrogen for a half-hour, it is heated to 43° C. Copolymerization is initiated and maintained for six hours at about 43° C. by gradual addition of about 1.5 ml of a 2% solution of tert-butyl hydroperoxide in water from a spring pump. Heat evolution lessens. After the mixture has been heated to 40° C., a one-milliliter portion of the hydroperoxide is added over a one-hour period. There is only a trace of coagulum to remove. The latex is coagulated with acetone and the crumbs of terpolymer obtained are rinsed three times with water and dried in a vacuum oven at 80° C. for three days. The yield: 296.5 grams. Inherent viscosity (measured on a solution of 0.1 gram of terpolymer in chloroform at 30° C.) 0.74. Composition: ethyl acrylate, 95 weight percent; ethyl hydrogen fumarate, 4 weight percent; ethylene dimethacrylate, 1 weight percent.

Polymer 63 is prepared as follows: A one-liter four neck round-bottom glass flask is charged at room temperature with 450 ml of water, 360 ml of n-butyl acrylate, 14.4 grams of ethyl hydrogen fumarate, 7.2 ml of a 30% solution of sodium lauryl sulfate in water, 0.24 gram of sodium hydrosulfite, and 0.1 ml of dodecyl mercaptan. After the resulting mixture has been sparged with nitrogen for a half-hour, it is heated to 43° C. and 2 ml of a 2% solution of tert-butyl hydroperoxide are added. During the next four hours 2 ml of a 10% solution of tert-butyl hydroperoxide are introduced. After addition of 0.24 gram of sodium hydrosulfite and one more milliliter of tert-butyl hydroperoxide, the mixture is heated to 40° C. and stirred 30 minutes longer. The mixture is once again heated to 40° C.; during the final hour at 40° C. still another milliliter of tert-butyl hydroperoxide is added. After the latex thus prepared has been strained free from 15 grams of coagulum, the copolymer is obtained by treating the latex with acetone.

The copolymer crumbs obtained are washed three times with water and dried in a vacuum oven at 80° C. The white product weighs 283.5 grams and has an inherent viscosity of 3.60 (measured at 30° C. on a solution of 0.1 gram of copolymer in chloroform). It contains 4 weight percent ethyl hydrogen fumarate monomer units.

Polymer 64 is prepared as follows:

A. Ethylene/Ethyl Hydrogen Maleate Copolymer

The random copolymer contains about 90 weight percent ethylene monomer units and 10 weight percent ethyl hydrogen maleate monomer units.

B. Ethylene/Propylene Copolymer

The random elastomeric ethylene/propylene monomer units and has a Mooney (ML-1+4/121° C.) viscosity of 51. It is made in solution in hexane at about 50° C. in an evaporatively cooled continuous reactor in the presence of a coordination catalyst made in situ by introducing $VCL_4$ and diisobutyl-aluminum monochloride (Al:V atomic ratio=6).

C. Preparation of Blend of Ethylene/Ethyl Hydrogen Maleate Copolymer and Ethylene/Propylene Copolymer A blend is prepared on a 150° C. roll mill using 64 gramsof the ethylene/ethyl hydrogen maleate copolymer of A and 256 grams of the ethylene/propylene copolymer of B. Mixing takes about 5 to 10 minutes. Analysis indicates that the blend contains 1.2 weight percent ethyl hydrogen maleate monomer units, 0.36 weight percent of maleic anhydride monomer units, and less than 0.15 weight percent of maleic acid monomer units.

Polymer 65 is prepared as follows: A 3-gram portion of phthalic anhydride sulfonyl azide is mixed with 300 grams of the elastomeric ethylene/propylene copolymer of Part B of Polymer 64 on an unheated rubber roll mill at ambient temperature. The resulting composition is transferred to 200° C. roll mill and sheared at 200° C. for 10 minutes to engraft phthalic anhydride sulfonyl groups onto the ethylene/propylene dipolymer.

Polymer 66 is prepared as follows: The base polymer grafted to ca. 1.4% fumaric acid by method of Polymer 39. The melt flow rate of the grafted polymer is ca. 3 grams/10 minutes by the method of ASTM D-1238 at 280° C. with a 2160 gram load.

Polymer 67 is a random elastomeric copolymer having a melt index of 10.0 grams/10 minutes.

Polymer 68 is polyurethane elastomer prepared as described in U.S. Pat. No. ;b 2,729,618 Texin ® 480 sold by Mobay.

Polymer 69 contains Herchlor ® C sold by Hercules Inc.

Polymer 70 is prepared as follows: A 3.54 gram portion of the monoethyl ester of phthalic anhydride sulfonyl azide was added to 300 grams of the base polymer on an unheated rubber roll mill at ambient temperature. One hundred fifty gram portions of the resulting composition are sheared for 10 minutes at 200° C.

Polymer 71 is prepared as follows: A 6.21 gram portion of the monooctadecyl ester of phthalic anhydride sulfonyl azide was added to 300 grams of the base polymer on an unheated rubber roll mill at ambient temperature. One hundred fifty gram portions of the resulting composition are sheared for 10 minutes at 200° C.

Polymer 72 is prepared by high pressure free radical polymerization.

Polymer 73 is the base polymer.

Polymer 74 is an ethylene-butene copolymer made by the Du Pont high density low pressure process; polymer density 0.937 gms/cc.

Polymer 75 is an ethylene homopolymer made by high pressure free radical polymerization; polymer density 0.920 gms/cc.

Polymer 76 is an ethylene homopolymer made by the Du Pont high density low pressure process; polymer density 0.957 gms/cc and melt index (Condition E) of 2.8 before grafting. Grafted by the method of Polymer 39.

Polymer 77 is grafted by method of Polymer 39. Polymer 78 is "Diene" 35 sold by Firestone Rubber Co.

TABLE 2

| TABLE OF ACRONYMS | |
|---|---|
| E | ethylene |
| IBA | isobutyl acrylate |
| MAA | methacrylic acid |
| MA | methyl acrylate |
| MAME | monoethyl ester of maleic anhydride |
| HMD | hexamethylene diamine |
| VA | vinyl acetate |
| MMA | methyl methacrylate |
| CO | carbon monoxide |
| AA | acrylic acid |
| HEMA | hydroxyethyl methacrylate |
| SMA | stearyl methacrylate |
| nBA | normal butyl acrylate |
| 2EHMA | 2-ethyl hexylmethacrylate |
| MVE | methyl vinyl ether |
| MAnh | maleic anhydride |
| GMA | glycidyl methacrylate |
| EDMA | ethylene glycol dimethacrylate |
| EA | ethyl acrylate |
| FA | fumaric acid |
| BuHM | butyl hydrogen maleate |
| PASA | phthalic anhydride sulfonyl azide |
| SMA (3000) | styrene maleic anhydride copolymer |
| FAME | monoethyl ester of fumaric acid |
| P | propylene |
| BASA | benzoic acid sulfonyl azide |
| BAN | butadiene acrylonitrile |
| SBR | styrene butadiene rubber |
| -g- | graft |

EXAMPLES 1 TO 163

These Examples prepared according to the procedure described above are set forth in Table 3.

Control A is molded of an intermediate molecular weight 66 nylon. Examples 1 through 5 are a concentration series using a terpolymer of ethylene, isobutyl acrylate and methacrylic acid partially neutralized with zinc. At the 30% concentration the notched Izod of a molded bar is over 10 ft. lbs./inch at the gate end and the far end. At 20% the material is tough at one end of the molded bar and at lower concentrations toughness is in the range of prior art materials at higher concentrations. Controls B through E are from the prior art and show that the higher modulus copolymer of ethylene and methacrylic acid is less effective in toughening polyamide matrix 1 than is the lower modulus terionomer.

Example 6 in comparison with Example 5 shows that reduction in molecular weight of the matrix causes reduced notched Izod in a composite structure. Examples 7 to 10 show the effect of increasing molecular weight of the matrix toughened with 20 weight percent of the terionomer. Example 10 with the highest molecular weight matrix provides toughening with the ethylene terpolymer ionomer so that at the 20% level toughness is approximately equivalent to that obtained at the 30% level in matrix 1.

Examples 11 and 12 should be compared with Examples 4 and 5 to show the range of reproducibility in what were supposed to be identical materials. Comparing Controls F and G with Controls D and E show similar reproducibility in prior art materials.

Controls H, I and J show that low ethylene, low modulus materials are not effective toughening agents when no adherent site is present. In comparison, Example 13 where an adherent site is present, gives very high toughness. Note that in comparison with Example 14 the only major difference between the polymers is the presence of the ionomer group in Example 13.

Examples 14 and 15 show the strong toughening effect of the unneutralized maleic acid monoethyl ester terpolymer in both an intermediate molecular weight polyamide with balanced end groups (Example 14) and in Example 15 a polyamide matrix with high amine ends. The high amine ends apparently provide more effective interaction with the dispersed acid toughening agent than the polyamide with a normal balance of end groups. When an ionomeric polymer is used there is generally less advantage in toughening a high amine ended nylon. Compare Example 16 with Example 4.

Examples 17 through 20 comprise a concentration series of the free acid toughening agent in high amine ended polyamide. At a concentration of 5% significant toughening is obtained. In fact, the material of Example 18 achieves very close to the toughness of prior art material (Control C) at ¼ the toughener concentration and with consequently substantially better tensile strength and modulus. Examples 19 and 21 illustrate the effect of the difference in concentration of amine ends in the polyamide. The effect at the 10% toughener concentration level is more dramatic than at the 20% level where the maximum in ductility as characterized by notched Izod is attained.

Example 23 shows that the acid polymer slightly neutralized with hexamethylene diamine is an effective toughening agent for nylon.

Examples 22, 25 and 26 show the effect of various degrees of neutralization to prepare ionomers used for toughening polyamides with balanced end groups. In a nylon matrix with balanced ends the zinc ionomer is a more effective polymer than the free acid polymer. Examples 24 and 25 differ primarily in details of the neutralization procedure which was carried out on a two roll mill and show that proper neutralization must be obtained in order to develop the most effective toughening. Conditions for neutralization are given in Table 1. It will be obvious to those skilled in the art that for any particular combination of polymer and matrix, optimization of processing conditions must be used to obtain the best result.

Examples 28 through Control L include three additional series where zinc neutralization was carried out from 0 to 100% or higher for three different toughening systems. In all three cases where a nylon with balanced ends was used preferred neutralization is in the range of 100% or below. Example 36 and Control L illustrate that neutralization at 125% can give reduced toughness, so that for practical purposes neutralization in the range of 100% or below for toughening agents used in an amide with balanced ends is preferred.

Examples 42 through 45 show that calcium, lithium, potassium and sodium ionomers can also be effective toughening agents when a soft organic moiety, e.g., ethylene/methyl acrylate/monoethyl ester of maleic anhydride (E/MA/MAME), is used with them. Example 46 illustrates that the antimony ionomer has some toughening effect. In most of the ionomerization experiments either the metal hydroxide or acetate was used as the neutralizing agent but other salts would also be effective. Examples 47 and 48 illustrate that organic salts of the metal ions may also be used.

Examples 49 and 50 in comparison with Examples 3 and 4 show that mixing small amounts of ethylene/methyl acrylate/maleic anhydride ester ionomers with ethylene/isobutylacrylate/methacrylic acid ionomers substantially improve the uniformity of compositions of the latter ionomer and polyamide alone.

Examples 51 and 52 illustrate that lower molecular weight polyamide can be effectively toughened by the E/MA/MAME system. The improvement in notched Izod above the base resin shown in Example 53 suggests that moderately greater concentration of polymer would give substantial toughness in nylon of this low molecular weight.

Examples 54 through 58 illustrate the potential of several different ethylene terpolymer ionomers for toughening polyamides. The results of Examples 59 and 60 suggest that higher molecular weight polymers are more effective than lower molecular weight materials. A broad range of molecular weights can be employed. Example 61 in comparison with Example 62 demonstrates the effectiveness of an ethylene/vinyl acetate/methacrylic acid terpolymer ionomer in a high amine end nylon in comparison with the same polymer in a nylon with balanced amine ends.

Examples 63 and 64 demonstrate the effectiveness of an additional ethylene terpolymer, the free acid in high amine end nylon and the ionomer in nylon with balanced end groups.

Controls M and N again show the need for an adherent site. In Example 65 ethylene/vinyl acetate/CO terpolymer has modest toughening effect on nylon with balanced end groups. In comparison, Examples 66 and 67 illustrate more effective toughening where amine ended nylon is believed to offer more effective interaction than balanced nylon with the carbonyl groups in the terpolymer. (Results with E/VA polymers have been less reproducible than with other polymers, apparently because of marginal stability at processing temperatures for 66 nylon.) Example 69 illustrates the effect of a blend of two previously used polymers with the mixture providing good uniformity of toughness. Example 70 illustrates mixing two polymers, the polymers used in Control N and Examples 3 and 4, to provide substantially better toughness than when either polymer is used alone. Similar effects of the mixtures of two polymers are shown in Examples 71 and 72.

Comparison of Example 73 with Control N shows that addition of a small amount of an adherent polymer with a low modulus nonadherent polymer can substantially increase its toughening capacity.

Examples 74 to 78 comprise a variety of ethylene terpolymers with CO as the reactive agent for the polyamide matrix. Several of these examples illustrate toughness approaching notched Izod of 10 at both ends of the bar and suggest that many of these materials could achieve 10 notched Izod uniformly with optimization of composition and processing, or some increase in toughener concentration.

Examples 79, 80 and 81 are ethylene/vinyl acetate terpolymers with a variety of functional groups all of which show improvement in toughening compared with Control N. Example 82 is a polymer containing 4 monomeric entities which also indicates that optimization would yield notched Izods over 10 throughout the length of the molded bar, though the cross-linking effect of ethylene glycol dimethacrylate (Control Q) may be deleterious.

Examples 83 through 103 illustrate the wide toughening capability of ethylene/propylene copolymers which contain small amounts of dienes suitable for attaching adherent sites. As the examples show a variety of these polymers of various molecular weight and ratios of ethylene to propylene and diene content may be employed. They may be used in polyamide with balanced end groups or high amine ends and a wide variety of adherent groups may be grafted thereto. Example 86, in comparison with Example 87, illustrates that at low concentrations of adherent sites, the monoacid is less effective than the dicarboxylic acid.

Example 102 illustrates that an ionomer of said copolymer is effective, and Example 103 illustrates that said copolymers toughen low molecular weight nylon. Examples 104 through 112 illustrate that a wide variety of low modulus polymers can be used to toughen nylon as long as an adherent group is present. The examples include most of the commonly available low cost synthetic and natural rubbers including butadiene/acrylonitrile rubber, styrene/butadiene rubber, buna rubber, isobutylene, isoprene, natural rubber, ethyl acrylate, butyl acrylate rubbers, etc. Controls O and P for Examples 104 and 110, respectively, show the importance of a site for adhesion to the matrix.

Examples 113 and 114 illustrate that ethylene/propylene copolymer can produce results similar to ethylene/propylene/diene terpolymer (Examples 83 to 103) provided that polymer with sites for adherence to the matrix are mixed in (Example 113) or the appropriate site is grafted onto the copolymer (Example 114) by appropriate means.

The concentration series of the ethylene/isobutyl acrylate/methacrylic acid ionomer in matrix 1 comprising Examples 3, 5, 115, Control R and Control S discloses that notched Izod well over 20 ft. lbs./inch can be obtained at high loadings of polymer. Significant loss in tensile strength and stiffness occur at high loadings with drastic loss over 50%, presumably because of phase inversion.

Examples 116, 117 and 118 show that 612 nylon can also be toughened with an ionomeric system. Consistent results are obtained in Samples 119 and 120 and Control T.

Nylon 6 is very effectively toughened by the zinc neutralized ionomer of E/MA/MAME, Control U and Example 121. Lower levels of toughener can be used.

Huls nylon 12, Control V is also effectively toughened by E/MA/MAME ionomer, Example 122, and E/IBA/MAA, Example 123. Urethane rubbers are sufficiently stable at the melt temperature of nylon 12 to be effective polymers, Example 124.

Nylon 11 is toughened by E/P/diene-g-FA, Examples 125 and 126.

Example 127 is an example of toughening a nylon copolymer.

Example 128 illustrates toughening of 66 nylon with balanced ends by an ethylene/propylene/1,4-hexadiene/norbornadiene polymer which contains approximately 1.4 weight percent fumaric acid. Similar results, Examples 129 and 130, are obtained with similar type polymers which are grafted with esters of phthalic anhydride sulfonyl azide.

Toughening of an amorphous polyamide with previously disclosed polymers is shown in Examples 131–133.

The same polymers toughen a polyamide containing a cyclic aliphatic structure (Examples 134–136).

Examples 137–141 in comparison with Control Y illustrate the toughening effectiveness of fumaric acid grafted ethylene/propylene/1,4-hexadiene/norbornadiene polymer at low concentrations.

Example 142 shows the effectiveness of a mixture of a soft (ethylene/methacrylate 46/54) and an adherent polymer (ethylene/acrylic acid 80/20).

Examples 144 to 149 and Controls Z and AA illustrate the effect of mixing branched polyethylenes of varying density with fumaric acid grafted ethylene/propylene/1,4-hexadiene/norbornadiene polymer. Examples 144 and Control Z were prepared by dry blending all the components and feeding to the twin screw extruder; Control AA and Examples 145 to 149 were prepared by milling the hydrocarbon polymers together before feeding to the extruder with the polyamide. Despite some variability in results, the examples illustrate the following points: (1) mixtures with softer polyethylene are more effective than those with higher modulus polyethylene, (2) a soft adherent polymer can render a mixture effective, (3) comparison with Control BB, which was prepared by first extruding the soft adherent polymer with the matrix and then reextruding to add the polyethylene, shows that the materials of the mixture must coexist in the same particles to provide effective toughening. Control CC shows that 5% of this polymer alone is not enough to confer very high levels of toughening on the matrix (comparison with Example 141 reflects the influence of amine ends on the matrix).

Comparison of Control DD and Example 150 illustrates the effect of difference in polymer modulus when degree of adherence is about identical.

Example 151 illustrates an effective mixture of butadiene rubber and an adherent material.

Examples 153 and 154, in comparison with Example 152, and Examples 156 through 160, in comparison with Example 155, illustrate that a variety of additives, e.g., up to about 4.5% by weight, can be compounded into a toughened composition without materially affecting mechanical properties. Example 153 contains a lubricant, Example 154 a heat stabilizer and Examples 156–160 contain colorants. In these experiments the additives were compounded into Examples 152 and 155 in a twin screw extruder with a vacuum port.

Example 162 was prepared by compounding 33 weight percent chopped glass fiber into the product of Example 161, on a single screw extruder with a vacuum port. The resultant product has a notched Izod nearly twice that of commercially available glass reinforced 66 nylon while retaining strength and stiffness approaching that of untoughened material. Example 163 illustrates similar improvement when mineral filler is added to polyamide.

TABLE 3

| Example | Polyamide Matrix (No.) | Polymer or Mixture | Neut. | Polymer Conc. (%) | N.I.* (ft.-lb./inch) | T.S. (Mp.s.i.) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| Control A | 1 | — | — | 0 | 1.0 | 12.5 | 40 | 412 | | |
| 1 | 1 | 1 | Zn 72% | 10 | 1.4/2.2 | 10.8 | 28 | 358 | 17,000 | |
| 2 | 1 | 1 | " | 15 | 2.1/3.5 | 9.5 | 36 | 325 | 17,000 | 0.2-1 |
| 3 | 1 | 1 | " | 20 | 2.4/16.7 | 8.5 | 43 | 280 | 17,000 | 0.1-1 |
| 4 | 1 | 1 | " | 20 | 2.4/17 | 9.1 | 40 | 290 | 17,000 | |
| 5 | 1 | 1 | " | 30 | 20.0/23.1 | 7.1 | 77 | 239 | 17,000 | |
| Control B | 1 | 2 | Zn 72% | 20 | 2.4/3.6 | 8.9 | 61 | 308 | 69,000 | 0.2-1 |
| Control C | 1 | 2 | " | 20 | 1.6/3.3 | 9.5 | 43 | 306 | 69,000 | |
| Control D | 1 | 2 | " | 30 | 2.9/20.0 | 7.8 | 70 | 256 | 69,000 | 0.1-2 |
| Control E | 1 | 2 | " | 40 | 25.8/28.4 | 7.0 | 120 | 217 | 69,000 | |
| 6 | 2 | 1 | " | 30 | 4.9/17.6 | 7.5 | 62 | 255 | 17,000 | |
| 7 | 1 | 1 | " | 20 | 2.4/3.6 | 9.2 | 40 | 306 | 17,000 | |
| 8 | 3 | 1 | " | 20 | 2.5/15.5 | 8.8 | 46 | 285 | 17,000 | |
| 9 | 4 | 1 | " | 20 | 3.0/16.9 | 8.9 | 46 | 285 | 17,000 | |
| 10 | 5 | 1 | " | 20 | 14.2/18.9 | 8.7 | 47 | 285 | 17,000 | |
| 11 | 1 | 1 | " | 20 | 2.2/6.1 | 9.2 | 37 | 272 | 17,000 | |
| 12 | 1 | 1 | " | 30 | 14.5/26.5 | 7.8 | 47 | 228 | 17,000 | |
| Control F | 1 | 2 | " | 30 | 2.3/22.2 | 8.3 | 77 | 264 | 69,000 | |
| Control G | 1 | 2 | Zn 72% | 40 | 24.1/28.1 | 7.5 | 56 | 222 | 69,000 | |
| Control H | 1 | 3 | — | 30 | 1.6/3.0 | 8.8 | 20 | 300 | 600 | |
| Control I | 1 | 3 | — | 40 | 1.6/1.3 | 6.1 | 34 | 194 | 600 | |
| Control J | 1 | 4 | — | 20 | 1.1/1.6 | 8.6 | 17 | 330 | 80 | |
| 13 | 1 | 5 | Zn 100% | 20 | 19.3/18.9 | 8.3 | 131 | 250 | 240 | 0.1-0.5 |
| 14 | 1 | 5 | 0 | 20 | 17.2/15.9 | 8.3 | 46 | 288 | 240 | 0.05-0.3 |
| 15 | 6 | 5 | 0 | 20 | 21.3/22.1 | 8.6 | 53 | 317 | 240 | |
| 16 | 6 | 1 | Zn 72% | 20 | 2.9/15.6 | 9.1 | 49 | 301 | 17,000 | |
| 17 | 6 | 5 | 0 | 2 | 1.1/1.2 | 12.5 | 26 | 410 | 240 | |
| 18 | 6 | 5 | 0 | 5 | 2.5/2.7 | 11.4 | 37 | 380 | 240 | |
| 19 | 6 | 5 | 0 | 10 | 15/17.6 | 9.9 | 48 | 348 | 240 | 0.1-0.4 |
| 20 | 6 | 5 | 0 | 15 | 19.9/21.7 | 9.2 | 71 | 341 | 240 | |
| 21 | 1 | 5 | 0 | 10 | 2.9/4.1 | 10.0 | 31 | 338 | 240 | |
| 22 | 1 | 5 | 0 | 15 | 8.3/13.3 | 9.2 | 34 | 321 | 240 | |
| 23 | 6 | 5 | HMD 12% | 15 | 11.8/13.3 | 9.7 | 43 | 307 | | |
| 24 | 1 | 5 | Zn 100% | 15 | 4.2/8.6 | 8.9 | 45 | 307 | 240 | |

Note: Example 17 was prepared by diluting Example 19 with matrix 6; Example 18 was prepared by diluting a mixture of Examples 19 and 20 with matrix 6.

| Example | Polyamide Matrix (No.) | Polymer or Mixture | Neut. | Polymer Conc. (%) | N.I.* (ft.-lb./inch) | T.S. (Mp.s.i.) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| 25 | 1 | 5 | Zn 100% | 15 | 18.4/18.0 | 9.7 | 73 | 293 | | |
| 26 | 1 | 5 | Zn 50% | 15 | 16.4/16.8 | 9.9 | 72 | 292 | 170 | 0.02-0.5 |
| 27 | 1 | 5 | (a) | 15 | 13.2/12.8 | 10.0 | 38 | 319 | 190 | 0.05-1 |
| 28 | 1 | 1 | 0 | 20 | 2.3/3.3 | 9.1 | 23 | 291 | | |
| 29 | 1 | 1 | Zn 25% | 20 | 2.4/13.6 | 9.8 | 30 | 292 | | |
| 30 | 1 | 1 | Zn 50% | 20 | 3.4/18.2 | 9.6 | 36 | 292 | | |
| 31 | 1 | 1 | Zn 71% | 20 | 3.2/18.6 | — | — | — | | |
| 32 | 1 | 1 | Zn 100% | 20 | 3.4/5.5 | 9.9 | 43 | 292 | | |
| 33 | 1 | 1A | Zn 50% | 20 | 2.1/12.4 | — | — | — | | |
| 34 | 1 | 1A | Zn 75% | 20 | 2.5/17.5 | 8.7 | 30 | 295 | 4,350 | |
| 35 | 1 | 1A | Zn 100% | 20 | 4.2/17.6 | — | — | — | | |
| Control X | 1 | 1A | Zn 125% | 20 | 3.9/4.2 | — | — | — | | |
| 36 | 1 | 5 | 0 | 20 | 17.2/15.9 | 8.3 | 46 | 288 | | |
| 37 | 1 | 5 | Zn 10% | 20 | 15.5/17.1 | 8.7 | 46 | 290 | | |
| 38 | 1 | 5 | Zn 25% | 20 | 17.2/18.9 | — | — | — | | |

(a) 25% neutralized by 7.5 dp oligomer.

| Example | Polyamide Matrix (No.) | Polymer or Mixture | Neut. | Polymer Conc. (%) | N.I.* (ft.-lb./inch) | T.S. (Mp.s.i.) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| 39 | 1 | 5 | Zn 50% | 20 | 18.7/19.4 | 8.3 | 62 | 286 | | |
| 40 | 1 | 5 | Zn 75% | 20 | 21.1/20.6 | — | — | — | | |
| 41 | 1 | 5 | Zn 100% | 20 | 20.7/21.7 | 7.8 | 121 | 263 | | |
| Control L | 1 | 5 | Zn 125% | 20 | 2.9/3.6 | — | — | — | | |
| 42 | 1 | 5 | Ca 100% | 15 | 3.8/12.9 | 9.8 | 37 | 318 | | |
| 43 | 1 | 5 | Li 100% | 15 | 17.4/18.7 | 9.4 | 53 | 311 | 250 | |
| 44 | 1 | 5 | K 100% | 15 | 17.0/17.6 | 8.7 | 60 | 318 | | |
| 45 | 1 | 5 | Na 100% | 20 | 14.0/14.2 | 8.6 | 74 | 263 | | |
| 46 | 1 | 5 | (b) | 15 | 3.1/5.4 | — | — | — | 470 | |
| 47 | 1 | 5 | (c) | 15 | 12.4/16.8 | 9.6 | 36 | 327 | | |
| 43 | 1 | 5 | (d) | 20 | 15.0/17.1 | 8.8 | 56 | 304 | | |
| 49 | 6 | 5 | Zn 100% | 5 15 | 15.4/20.2 | 8.8 | 51 | 295 | | |
| 50 | 6 | 5 | Zn 100% | 2.5 17.5 | 12.0/20.3 | 9.1 | 40 | — | | |

(b) Sb+++ 100%
(c) K Stearate
(d) Zn "Pexate" 100%, Zinc resinate made by Hercules Inc.

| Example | Polyamide Matrix (No.) | Polymer or Mixture | Neut. | Polymer Conc. (%) | N.I.* (ft.-lb./inch) | T.S. (Mp.s.i.) | Elongation (%) | Flex. Mod. (Mp.s.i) | Polymer or Mixture Tensile Mod.(psi) |
|---|---|---|---|---|---|---|---|---|---|
| 51 | 7 | 5 | 0 | 20 | 15.5/17.2 | 8.0 | 14 | 270 | 340 |
| 52 | 7 | 5 | 0 | 20 | 14.0/15.7 | 8.0 | 43 | 262 | |
| 53 | 2 | 5 | 0 | 20 | 3.1/3.7 | 8.7 | 48 | 328 | 120 |
| 54 | 1 | 6 | Zn 75% | 20 | 15.4/17.5 | — | — | — | |
| 55 | 1 | 7 | Zn 75% | 20 | 4.5/16.1 | — | — | — | |
| 56 | 1 | 8 | Zn 75% | 20 | 12.3/17.5 | — | — | — | |
| 57 | 1 | 9 | Zn 75% | 20 | 4.3/17.1 | — | — | — | |
| 58 | 1 | 10 | Ca 100% | 20 | 4.6/11.2 | 8.3 | 15 | 304 | 1,500 |

TABLE 3-continued

| Example | Polyamide Matrix (No.) | Polymer or Mixture | Neut. | Polymer Conc. (%) | N.I.* (ft.-lb./inch) | T.S. (Mp.s.i) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| 59 | 1 | 11 | Zn 75% | 20 | 2.8/5.0 | — | — | — | | |
| 60 | 1 | 11 | Zn 75% | 20 | 3.87/14.3 | — | — | — | | |
| 61 | 6 | 12 | Zn 75% | 20 | 14.6/18.2 | — | — | — | | |
| 62 | 1 | 12 | Zn 75% | 20 | 3.5/6.1 | — | — | — | 8,400 | |
| 63 | 6 | 13 | 0 | 20 | 13.4/18.4 | 8.4 | 88 | 290 | | |
| 64 | 1 | 13 | Zn 75% | 20 | 13.4/19.9 | — | — | — | | |
| Control M | 1 | 14 | — | 20 | 2.2/3.0 | 8.5 | 19 | 284 | 945 | |
| Control N | 1 | 15 | — | 20 | 2.9/2.9 | 8.6 | 20 | 299 | 450 | |
| 65 | 1 | 16 | — | 20 | 2.5/7.1 | 8.4 | 27 | 286 | | |
| 66 | 6 | 17 | — | 20 | 11.2/13.4 | 8.3 | 33 | 277 | | |
| 67 | 6 | 16 | — | 20 | 9.6/14.1 | 8.4 | 34 | 283 | | |
| 68 | 1 | 16 | — | 20 | 4.6/8.0 | 9.2 | 23 | 290 | | |
| 69 | 1 | 1 | Zn 72% | 10 | 11.7/14.4 | 9.5 | 28 | 294 | | |
|   |   | 18 | — | 10 | | | | | | |
| 70 | 1 | 1 | Zn 72% | 10 | 12/18 | 9.0 | 20 | 292 | 6,000 | 0.05–0.6 |
|   |   | 19 | — | 10 | | | | | | |
| 71 | 1 | 1 | Zn 72% | 15 | 12/17 | 9.4 | 34 | 307 | | 0.1–0.5 |
|   |   | 20 | — | 5 | | | | | | |
| 72 | 1 | 1 | Zn 72% | 15 | 12/16 | 9.5 | 33 | 308 | | 0.1–0.5 |
|   |   | 21 | — | 5 | | | | | | |
| 73 | 6 | 22 | — | 5 | 3.3/13 | 9.6 | 19 | 323 | | |
|   |   | 15 | — | 15 | | | | | | |
| 74 | 1 | 23 | — | 20 | 4.7/11.8 | 8.2 | 26 | 276 | 2,400 | 0.1–0.5 |
| 75 | 6 | 24 | — | 20 | 3.5/11.3 | 9.6 | 38 | 308 | 8,800 | |
| 76 | 6 | 25 | — | 20 | 2.8/11.1 | 8.0 | 31 | 295 | | |
| 77 | 6 | 26 | — | 20 | 9.0/14.2 | 8.3 | 26 | 300 | | |
| 78 | 6 | 27 | — | 20 | 7.8/9.7 | 8.1 | 55 | 295 | 260 | |
| 79 | 1 | 28 | 0 | 20 | 13.9/8.4 | 7.7 | 29 | 276 | 410 | 0.02–0.3 |
| 80 | 6 | 29 | 0 | 10 | 3.6/9.9 | 10.4 | 39 | 349 | 1,100 | |
| 81 | 6 | 30 | 0 | 20 | 10.1/14.7 | 8.3 | 45 | 268 | | 0.1–1 |
| 82 | 6 | 31 | 0 | 20 | 5.8/12.7 | 8.4 | 81 | 293 | 50 | 0.2–1 |
| 83 | 1 | 32 | 0 | 20 | 16.7/18.1 | 7.4 | 46 | 256 | 1,200 | 0.1–1 |
| 84 | 6 | 33 | 0 | 20 | 10.6/13.8 | 8.5 | 21 | 323 | | 0.05–1 |
| 85 | 6 | 34 | 0 | 20 | 12.7/16.8 | 8.0 | 25 | 281 | | 0.1–1 |
| 86 | 6 | 35 | 0 | 20 | 3.5/4.4 | 8.3 | 36 | 295 | | |
| 87 | 1 | 36 | 0 | 20 | 18.4/20.6 | 7.1 | 62 | 268 | | |
| 88 | 1 | 37 | 0 | 20 | 12.4/13.5 | 7.3 | 43 | 258 | | |
| 89 | 6 | 38 | 0 | 20 | 15.8/18.9 | 6.4 | 40 | 267 | | |
| 90 | 6 | 37 | 0 | 20 | 19.2/21.4 | 8.1 | 45 | 260 | | |
| 91 | 1 | (d) | 0 | 5 | 15.3/17.5 | 7.2 | 41 | 279 | | |
|   |   | 39 | — | 20 | | | | | | |
| 92 | 1 | 40 | 0 | 20 | 11.9/15.6 | 7.8 | 35 | 304 | | |
| 93 | 1 | 41 | 0 | 20 | 9.5/11.1 | 7.6 | 22 | 269 | | |

(d)Zn resinate 100% ("Pexate" 511)

| Example | Polyamide Matrix (No.) | Polymer or Mixture | Neut. | Polymer Conc. (%) | N.I.* (ft.-lb./inch) | T.S. (Mp.s.i) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| 94 | 1 | 42 | 0 | 20 | 12.1/12.3 | 7.8 | 37 | 264 | | |
| 95 | 1 | 43 | 0 | 20 | 11.4/12.5 | 7.7 | 28 | 261 | | |
| 96 | 1 | 44 | 0 | 20 | 9.3/12.7 | 8.2 | 18 | 287 | | |
| 97 | 1 | 45 | 0 | 20 | 11.2/12.7 | 8.0 | 29 | 274 | | |
| 98 | 1 | 46 | 0 | 20 | 10.5/13.8 | 8.2 | 27 | 290 | | |
| 99 | 1 | 47 | 0 | 20 | 11.6/15.2 | 8.1 | 25 | 286 | | |
| 100 | 1 | 48 | 0 | 20 | 11.3/14.7 | 8.4 | 29 | 296 | | |
| 101 | 1 | 49 | 0 | 20 | 13.3/15.0 | 8.1 | 39 | 287 | | |
| 102 | 1 | 50 | Zn 100% | 20 | 14.1/16.1 | 7.6 | 48 | 255 | | |
| 103 | 2 | 51 | 0 | 20 | 13.6/13.2 | 6.7 | 65 | 226 | | |
| 104 | 6 | 52 | 0 | 20 | 10.9/11.5 | 8.3 | 47 | 300 | | |
| Control O | 6 | 53 | — | 20 | 2.9/2.9 | 7.7 | 39 | 310 | | |
| 105 | 6 | 54 | 0 | 20 | 7.6/16.9 | 7.6 | 48 | 281 | | |
| 106 | 6 | 55 | 0 | 20 | 5.4/4.6 | 6.7 | 45 | 266 | | |
| 107 | 6 | 56 | 0 | 20 | 21.8/22.7 | 7.2 | 55 | 263 | 120 | |
| 108 | 1 | 57 | 0 | 20 | 5.9/3.7 | 8.5 | 50 | 296 | | |
| 109 | 6 | 58 | 0 | 20 | 4.4/13.9 | 8.1 | 37 | 271 | | |
| 110 | 1 | 59 | 0 | 20 | 9.9/12.9 | 8.2 | 31 | 277 | | |
| Control P | 1 | 60 | — | 20 | 1.2/1.5 | 7.8 | 19 | 329 | | |
| 111 | 6 | 61 | 0 | 20 | 22.7/21.5 | 9.1 | 124 | 291 | 24 | 0.05–0.6 |
| Control Q | 6 | 62 | 0 | 10 | 2.4/2.3 | | | | 40 | |
| 112 | 6 | 63 | 0 | 20 | 22.2/22.2 | 8.4 | 104 | 276 | 19 | 0.02–0.6 |
| 113 | 1 | 64 | — | 20 | 11.5/15.2 | 7.9 | 29 | 276 | 1,050 | |
| 114 | 1 | 65 | 0 | 20 | 19.4/20.1 | 6.9 | 65 | 238 | 400 | |
| 115 | 1 | 1 | Zn 72% | 40 | 28.4/28.7 | 6.2 | 160 | 185 | 17,000 | |
| Control R | 1 | 1 | " | 50 | 27.9/29.4 | 6.7 | 120 | 204 | 17,000 | |
| Control S | 1 | 1 | " | 70 | NB | 4.0 | 170 | 35 | 17,000 | |
| 116 | 8 | 1 | " | 30 | 4.5/16 | 5.9 | 114 | 196 | 17,000 | |
| 117 | 8 | 1 | " | 20 | 2.8 | 6.8 | 86 | 234 | 17,000 | |
| 118 | 8 | 1 | " | 10 | 1.6 | 7.9 | 61 | 279 | 17,000 | |
| Control T | 9 | — | — | 0 | 0.6/0.7 | 6.8 | 22 | 317 | 17,000 | |
| 119 | 9 | 66 | 0 | 20 | 12.8/15.3 | 5.7 | 55 | 194 | | |
| 120 | 9 | 67 | Zn 100% | 20 | 14.2/15.8 | 6.3 | 50 | 218 | | |

TABLE 3-continued

| Example | Polyamide Matrix (No.) | Polymer or Mixture | Neut. | Polymer Conc. (%) | N.I.* (ft.-lb./ inch) | T.S. (Mp.s.i.) | Elongation (%) | Flex. Mod. (Mp.s.i) | Polymer or Mixture Tensile Mod.(psi) | Polymer Dispersed Particle Size (Microns) |
|---|---|---|---|---|---|---|---|---|---|---|
| Control U | 10 | | — | 0 | 0.8/0.8 | 11.6 | 43 | 369 | | |
| 121 | 10 | 67 | Zn 100% | 20 | 27.3/26.9 | 8.9 | >160 | 255 | | |
| Control V | 11 | | — | 0 | 0.8/0.7 | 6.8 | >220 | 214 | | |
| 122 | 11 | 67 | Zn 100% | 20 | 22.7/20.6 | 5.8 | >160 | 142 | | |
| 123 | 11 | 1 | Zn 72% | 20 | 20/21 | 5.2 | 272 | 162 | | |
| 124 | 11 | 68 | — | 20 | 17.5/16.8 | 4.0 | >190 | 157 | 3,500 | 0.1–0.3 |
| 125 | 12 | 66 | 0 | 20 | 10/10 | 4.7 | 202 | 125 | | |
| 126 | 12 | 66 | 0 | 10 | 9.2/8.1 | 5.6 | 265 | 155 | | |
| 127 | 13 | 69 | — | 30 | 13.8/15.6 | 6.7 | 132 | 207 | 90 | |
| 128 | 1 | 66 | 0 | 15 | 16.2/17.6 | 8.5 | 92 | 290 | | |
| 129 | 1 | 70 | 0 | 20 | 19.8/21.1 | 7.0 | 62 | 261 | | |
| 130 | 1 | 71 | 0 | 20 | 18.1/20.0 | 7.2 | 27 | 273 | | |
| Control W | 14 | | — | 0 | 1.8/1.6 | 12.6 | 120 | | 352 | |
| 131 | 14 | 1 | Zn 72% | 20 | 21.6/21.4 | 8.5 | 128 | 301 | | |
| 132 | 14 | 66 | 0 | 10 | 17.9/19.2 | 10.5 | 142 | 320 | | |
| 133 | 14 | 5 | 0 | 10 | 17.1/21.2 | 11.1 | 97 | 360 | | |
| Control X | 15 | | — | 0 | 1.5/1.7 | 8.8 | 153 | 215 | | |
| 134 | 15 | 1 | 0 | 20 | 18.7/20.3 | 7.0 | 155 | 172 | | |
| 135 | 15 | 66 | 0 | 5 | 13.2/8.5 | 7.8 | 130 | 209 | | |
| 136 | 15 | 5 | 0 | 10 | 17.1/16.5 | 7.4 | 143 | 194 | | |
| Control T | 6 | | — | 0 | 0.90/0.85 | 11.6 | 32 | 421 | | |
| 137 | 6 | 66 | 0 | 1 | 1.01/1.17 | 12.4 | 43 | 426 | | |
| 138 | 6 | 66 | 0 | 2 | 1.25/1.75 | 12.1 | 38 | 414 | | |
| 139 | 6 | 66 | 0 | 3 | 1.67/2.29 | 11.7 | 34 | 392 | | |
| 140 | 6 | 66 | 0 | 4 | 2.10/2.79 | 11.4 | 34 | 382 | | |
| 141 | 6 | 66 | 0 | 5 | 2.37/3.29 | 11.2 | 32 | 366 | | |
| 142 | 6 | 22 | 0 | 6.7 | 14.7/11.7 | 8.5 | 66 | 304 | | |
| | | 72 | — | 13.3 | | | | | | |
| 143 | 1 | 66 | 0 | 5 | 12.2/14.9 | 8.8 | 32 | 301 | | |
| | | 73 | — | 10 | | | | | | |
| Control Z | 1 | 66 | 0 | 5 | 2.4/11.5 | 8.2 | 38 | 264 | | |
| | | 74 | — | 20 | | | | | | |
| 144 | 1 | 66 | 0 | 5 | 10.9/13.5 | 7.7 | 33 | 250 | | |
| | | 75 | — | 20 | | | | | | |
| Control AA | 6 | 66 | 0 | 5 | 2.2/2.4 | | | | 55,400 | |
| | | 74 | — | 20 | | | | | | |
| 145 | 6 | 65 | 0 | 5 | 8.6/13.1 | | | | 53,800 | |
| | | 74 | — | 15 | | | | | | |
| 146 | 6 | 66 | 0 | 5 | 16.2/16.0 | | | | 44,400 | |
| | | 74 | — | 10 | | | | | | |
| 147 | 6 | 66 | 0 | 5 | 4.5/9.0 | | | | 18,000 | |
| | | 75 | — | 20 | | | | | | |
| 148 | 6 | 66 | 0 | 5 | 17.7/17.8 | | | | 17,300 | |
| | | 75 | — | 15 | | | | | | |
| 149 | 6 | 66 | 0 | 5 | 15.7/12.1 | | | | 14,000 | |
| | | 75 | — | 10 | | | | | | |
| Control BB | 6 | 66 | 0 | 5 | 2.0/2.4 | | | | | |
| | | 75 | — | 20 | | | | | | |
| Control CC | 6 | 66 | 0 | 5 | 1.8/1.4 | | | | | |
| Control DD | 1 | 76 | 0 | 20 | 1.8/1.8 | | | | | |
| 150 | 1 | 77 | 0 | 15 | 11.1/13.8 | | | | | |
| 151 | 6 | 66 | 0 | 5 | 14.0/15.7 | | | | 86 | |
| | | 78 | — | 15 | | | | | | |
| 152[1] | 1 | 66 | 0 | 15 | 12.9/15.9 | 8.3 | 49 | 295 | | |
| 153[2] | 1 | 66 | 0 | 15 | 13.5/15.1 | 8.2 | 45 | 283 | | |
| 154[3] | 1 | 66 | 0 | 15 | 13.2/14.8 | 8.5 | 40 | 296 | | |
| 155[1] | 1 | 66 | 0 | 15 | 14.0/15.7 | 8.5 | 43 | 294 | | |
| 156[4] | 1 | 66 | 0 | 15 | 15.1/17.4 | 8.7 | 42 | 297 | | |
| 157[5] | 1 | 66 | 0 | 15 | 15.2/16.5 | 8.6 | 49 | 290 | | |
| 158[6] | 1 | 66 | 0 | 15 | 13.9/16.0 | 8.4 | 51 | 276 | | |
| 159[7] | 1 | 66 | 0 | 14.3 | 13.8/16.2 | 8.7 | 42 | 312 | | |
| 160[8] | 1 | 66 | 0 | 14.3 | 15.2/17.3 | 8.2 | 55 | 285 | | |
| 161[1] | 1 | 66 | 0 | 15 | 14.7/16.1 | 8.4 | 47 | 287 | | |
| 162[9] | 1 | 66 | 0 | 10 | 4.2 | 24.4 | 3.5 | 1,130 | | |

TABLE 3-continued

| Example | Polyamide Matrix (No.) | Polymer or Mixture | Neut. | Polymer Conc. (%) | N.I.* (ft.-lb./inch) | T.S. (Mp.s.i.) | Elongation (%) | Flex. Mod. (Mp.s.i) | Polymer or Mixture Tensile Mod.(psi) | Polymer Dispersed Particle Size (Microns) |
|---------|------------------------|---------------------|-------|-------------------|----------------------|----------------|----------------|---------------------|--------------------------------------|-------------------------------------------|
| 163[10] | 1 | 66 | 0 | 9.6 | 1.4 | 10.3 | 4.4 | 870 | | |

*Samples with Notched Izod value in the range of 10 ft.-lbs./inch or more do not break completely. Values over the virgule represent the end of a bar near the gate; values under the virgule represent the far end of the bar.
[1] No additive
[2] 0.1% aluminum stearate
[3] 0.41% mixture of potassium and cuprous iodide, .09% aluminum stearate
[4] 0.65% ultramarine blue, 0.18% titanium dioxide, 0.003% Ferro Corp. Black V-302, 0.1% ethylene bis-stearamide
[5] .79% cadmium red, .007% Black V-302, 0.1% ethylene bis-stearamide
[6] 0.65% cadmium yellow, 0.05% titanium dioxide, 0.1% ethylene bis-stearamide
[7] 2.35% titanium dioxide, 2.25% ultramarine blue, .07% Ferro Corp. violet 6-6270, 0.1% ethylene bis-stearamide
[8] 4.5% Ampacet Black Concentration 19238 sold by Ampacet Corp. - contains 45% dispersed furnace black.
[9] 33% chopped glass fiber PPG 3531 sold by Pittsburgh Plate
[10] 36% Wallastonite F-1 sold by Interpace and 0.3% silane A 1100 sold by Union Carbide.
Note: The particle size of the polymers in all examples is 3.0 microns or less.

EXAMPLES 164 to 167

These Examples illustrate uniformity of toughness in a 3 inch by five inch by ⅛ inch thick molded plaque. Samples are cut from this plaque so that notched Izod may be determined near and far from the gate in the flow and transverse directions. Utilizing the procedure described previously above thermoplastic compositions are prepared having the composition set forth in Table 4. Controls 1 and 3 represent toughened prior art polyamide compositions. Examples 164 to 167 represent compositions of this invention. Examples 166 and 167, in particular, have uniformly high toughness with 20 percent by weight polymer added to the polyamide matrix.

The data in Table 5 illustrate the effect of decreasing notch radius on certain prior art compositions and preferred compositions of the invention. The results show that the prior art materials are more sensitive to this effect than the preferred compositions of this invention.

A further test which demonstrates the effect of notched radius on toughness is as follows. Each of the following materials was scratched to a depth of 20 mils with a razor blade which gives a notch radius of about 0.2 mil and was tested using a Gardner Impact Tester IG-1115 manufactured by Gardner Laboratories, Inc., Bethesda, Maryland. The break occurred at the following loadings.

| Matrix 1 | 6 inch pounds |
|----------|---------------|
| Control B | 8 inch pounds |

Using the same procedure a material as described in Example 5 of the present invention broke at 69 inch pounds.

TABLE 4

NOTCHED IZOD AS A FUNCTION OF POSITION

| | | Izod Values (Ft.-lbs./in.) | | | |
|---|---|---|---|---|---|
| | Thermoplastic | Flow | | Transverse | |
| Example | Composition | Near | Far | Near | Far |
| Control 1 | Polyamide 16 | 9.1 | 6.5 | 3.0 | 7.4 |
| Control 2 | Polyamide 1 | 0.84 | 0.88 | 1.0 | 0.96 |
| Control 3 | Control B | 2.6 | 2.6 | 1.8 | 3.2 |
| 164 | 20% Polymer 1 in Polyamide 1 | 8.8 | 4.0 | 3.7 | 5.5 |
| 165 | 30% Polymer 1 in Polyamide 1 | 22.3 | 24.5 | 19.5 | 25.8 |
| 166 | 20% Polymer 43 in Polyamide 1 | 12.8 | 13.1 | 12.1 | 15.3 |
| 167 | 20% Polymer 5 in Polyamide 1 | 11.8 | 13.1 | 11.7 | 14.8 |

TABLE 5

EFFECT OF NOTCH RADIUS ON NOTCHED IZOD

| | | Notch Radius | |
|---|---|---|---|
| Example | Thermoplastic Composition | N.I. (ft.-lb./in.) at 2 MM radius | N.I. (ft.-lb./in.) at 10 MM radius |
| Control 1 | Polyamide 1 | 0.96 | 0.98 |
| Control 2 | Polyamide 7 | 1.24 | 2.22 |
| Control 3 | Polyamide 14 | 1.15 | 15.00 |
| Control 4 | Polyamide 15 | 2.6/15.1[1] | 3.2/16.9 |
| 14 | Polyamide 1 + 20% Polymer 5 | 18.3/18.7 | 16.5/18.0 |
| 114 | Polyamide 1 + 20% Polymer 65 | 13.4/17.8 | 14.1/19.1 |
| 84 | Polyamide 6 + 20% Polymer 33 | 10.3/13.8 | 10.6/13.8 |
| 112 | Polyamide 6 + 20% Polymer 63 | 20.8/21.4 | 22.2/22.2 |
| 81 | Polyamide 6 + 20% Polymer 30 | 11.1/15.4 | 10.1/14.7 |
| 69 | Polyamide 6 + 10% Polymer 1 + 10% Polymer 18 | 9.5/12.1 | 11.7/14.4 |
| 105 | Polyamide 6 + 20% Polymer 52 | 10.7/11.4 | 10.9/11.5 |
| 111 | Polyamide 6 + 20% Polymer 61 | 15.0/7.7 | 22.7/21.5 |
| 70 | Polyamide 1 + 10% Polymer 1 + 10% Polymer 19 | 11.7/10.3 | 12.0/18.0 |
| 44 | Polyamide 1 + 15% Polymer 5 | 15.9/17.9 | 17.3 |

[1] Gate end/far end

EXAMPLE 168

A blend of 85 weight percent of Matrix 1 and 15 weight percent of Polymer 66 containing additives of EXample 154 was melt extruded into the form of a film. The blend was extruded at a temperature in the range of 280°–285° C. in a Sterling extruder through an 8-inch (20.32 centimeters) wide Johnson die maintained at a temperature of about 290°–295° C. The molten film was extruded onto the surface of a rotating (at about 15 feet (4.572 meters) per minute) quench drum maintained at a temperature of about 70° C. Full wire electrostatic pinning was used to insure uniform quenching of the cast film which was 10 mils (250 microns) in thickness. Sheets, 4 inches by 4 inches (10.16 centimeters by 10.16 centimeters), cut from the roll of cast film were stretched simultaneously (in a T. M. Long Co. stretcher) 2.5X in mutually perpendicular directions at a temperature of about 230° C. The cast film stretched uniformly in all directions. Matrix 1 is extremely difficult to cast into a film hence a control of Matrix 5 was utilized. A cast film of Matrix 5 without Polymer 66 was difficult to stretch uniformly and tended to exhibit line drawing.

Another sample of the cast film was thermoformed, after being preheated for about 40 seconds in an oven heated to about 210° C., into the shape of a dish 1.5 inches (3.81 centimeters) deep by 5 inches (12.7 centimeters) in diameter. The male portion of the dish mold was heated to about 200° C. and the female portion was at about 160° C.

I claim:

1. A toughened multiphase thermoplastic composition consisting essentially of one phase containing 60 to 99 percent by weight of a polyamide matrix resin of number average molecular weight of at least 5,000, and 1 to 40 percent by weight of at least one other phase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 psi, the ratio of the tensile modulus of the polyamide matrix resin to tensile modulus of said at least one polymer being greater than 10 to 1 wherein said at least one polymer comprises at least 20 percent by weight of said at least one other phase and is represented by the formula:

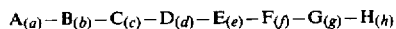

$A_{(a)} - B_{(b)} - C_{(c)} - D_{(d)} - E_{(e)} - F_{(f)} - G_{(g)} - H_{(h)}$ derived in any order from monomers A to H wherein A is ethylene;

B is CO;

C is an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;

D is an unsaturated epoxide of 4 to 11 carbon atoms;

E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

F is an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms;

G is an unsaturated monomer having at least one substituent selected from the group consisting of pendant hydrocarbon chains of 1 to 12 carbon atoms and pendant aromatic groups which may have 1 to 6 substituent groups having a total of 14 carbon atoms; and H is an unsaturated monomer taken from the class consisting of branched, straight chain and cyclic compounds having from 4 to 14 carbon atoms and at least one additional unsaturated carbon-carbon bond capable of being grafted with a monomer having at least one reactive group of the type defined in C, D and E;

monomers A to H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

2. A composition according to claim 1 wherein the tensile modulus of said at least one polymer is about 5.0 to 20,000 p.s.i. and the ratio of tensile modulus is greater than 20 to 1.

3. A composition according to claim 1 wherein said at least one polymer is present as part of a mixture.

4. A composition according to claim 1 wherein the ratio of tensile modulus is greater than 20 to 1.

5. A composition according to claim 1 wherein the polyamide matrix resin melts above 200° C.

6. A composition according to claim 5 wherein the polyamide matrix resin is taken from the class consisting of straight chain and branched chain polyamides.

7. A toughened multiphase thermoplastic composition consisting essentially of one phase containing 60 to 99 percent by weight of a polyamide matrix resin of number average molecular weight of at least 5,000, and 1 to 40 percent by weight of at least one other phase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 psi, the ratio of the tensile modulus of the polyamide matrix resin to tensile modulus of said at least one polymer being greater than 10 to 1 wherein the polyamide melts below 200° C. and the said at least one polymer comprises at least 20 percent by weight of said at least one other phase and is a polyurethane which is the reaction product of at least one glycol taken from the class consisting of polyester glycol having an average molecular weight of 300 to 6,000 and a polyether glycol having an average molecular weight of 300 to 6,000, and optionally at least one diol having a molecular weight of less than 300, and at least one diisocyanate having 4 to 21 carbon atoms.

8. A toughened multiphase thermoplastic composition consisting essentially of one phase containing 60 to 99 percent by weight of a polyamide matrix resin of number average molecular weight of at least 5,000, and 1 to 40 percent by weight of at least one other phase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 psi, the ratio of the tensile modulus of the polyamide matrix resin to tensile modulus of said at least one polymer being greater than 10 to 1 wherein the polyamide melts below 225° C. and the said at least one polymer comprises at least 20 percent by weight of said at least one other phase and is a polymer containing polyether repeat units taken from the class consisting of the reaction product of epoxide-containing monomers having 2 to 3 carbon atoms, an epoxide-containing monomer having pendant groups taken from the class consisting of methyl or chloromethyl groups, and mixtures of said epoxide monomers.

9. A composition according to claim 6 wherein the notched Izod in the dry as molded condition is at least the values represented by the formulae:

$B + 0.2 C_1$ $B + 2.0 + 0.5 (C_2 - 10)$, $B + 12.0$ where

B is the notched Izod of the polyamide matrix resin, $C_1$ is 2 to 10 percent by weight of the at least one polymer, and $C_2$ is 10 to 30 percent by weight of the at least one polymer, and the notched Izod is at least $B + 12.0$ when the concentration of the at least one polymer is between 30 and 40 percent by weight.

10. A composition according to claim 6 wherein the notched Izod value, dry as molded, is greater than 8 ft. lbs./inch when the concentration of said at least one polymer is from 5 to 20 percent by weight.

11. A composition according to claim 1 wherein the polyamide is the condensation reaction product of a dicarboxylic acid of 4 to 12 carbon atoms and a diamine of 4 to 14 carbon atoms.

12. A composition according to claim 1 wherein the polyamide is polycaprolactam.

13. A composition according to claim 1 wherein there is present up to 5.0 percent by weight, based on the weight of the composition, of at least one colorant.

14. A composition according to claim 1 wherein there is present up to 50 percent by weight, based on the weight of the composition, of glass fibers.

15. A composition according to claim 1 wherein there is present up to 50 percent by weight, based on the weight of the composition, of fibrous and particulate mineral fillers and reinforcements.

16. A composition according to claim 1 wherein there is present up to 1.0 percent by weight, based on the weight of polyamide, of a stabilizer.

17. A composition according to claim 1 wherein said at least one polymer has present carbon monoxide.

18. A composition according to claim 1 wherein said at least one polymer has present an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24.

19. A composition according to claim 1 wherein said at least one polymer has present an unsaturated epoxide of 4 to 11 carbon atoms.

20. A composition according to claim 1 wherein said at least one polymer has present the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions.

21. A composition according to claim 6 wherein said at least one polymer has present carbon monoxide.

22. A composition according to claim 6 wherein said at least one polymer has present an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24.

23. A composition according to claim 6 wherein said at least one polymer has present an unsaturated epoxide of 4 to 11 carbon atoms.

24. A composition according to claim 6 wherein said at least one polymer has present the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions.

25. A composition according to claim 1 wherein said at least one polymer has present an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms.

26. A composition according to claim 1 wherein said at least one polymer has present an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms.

27. A composition according to claim 1 wherein said at least one polymer has present an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

28. A composition according to claim 6 wherein said at least one polymer has present an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms.

29. A composition according to claim 6 wherein said at least one polymer has present an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms.

30. A composition according to claim 6 wherein said at least one polymer has present an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

31. A composition according to claim 4 wherein said at least one polymer consists essentially of polymerized ethylene, at least one polymerized α-olefin of 3 to 6 carbon atoms, and at least one polymerized unsaturated monomer taken from the class consisting of branched, straight chain and cyclic compounds having from 4 to 14 carbon atoms and at least one additional nonconjugated unsaturated carbon-carbon bond, and grafted thereto an unsaturated monomer taken from the class consisting of α,β-ethylenically unsaturated dicarboxylic acids having from 3 to 8 carbon atoms, and derivatives thereof taken from the class consisting of monoesters of alcohols of 1 to 29 carbon atoms, anhydrides of the dicarboxylic acids, the metal salts of the dicarboxylic acids and the monoesters of said dicarboxylic acid having from 0 to 100 percent of the carboxylic groups ionized by neutralization with metal ions.

32. A composition according to claim 31 wherein said at least one polymer is a copolymer of ethylene, propylene and 1,4-hexadiene having grafted thereto an unsaturated monomer taken from the class consisting of fumaric acid, maleic acid, maleic anhydride and the monoalkyl ester of said acids in which the alkyl group of the ester has 1 to 3 carbon atoms, said at least one polymer having an after grafting melt flow rate of 0.1 to 100 g./10 minutes, ASTM D 1238 at 280° C. and a total load of 2160 grams.

33. A composition according to claim 31 wherein said at least one polymer is a tertrapolymer of ethylene, propylene, 1,4-hexadiene and 2,5-norbornadiene having grafted thereto an unsaturated monomer taken from the class consisting of fumaric acid, maleic acid, maleic anhydride and the monoalkyl ester of said acids in which the alkyl group of the ester has 1 to 3 carbon atoms, said at least one polymer having an after grafting melt flow rate of 0.1 to 100 g./10 minutes, ASTM D 1238 at 280° C. and a total load of 2160 grams.

34. A composition according to claim 32 wherein said polyamide matrix resin is polyhexamethylene adipamide.

35. A composition according to claim 33 wherein said polyamide matrix resin is polyhexamethylene adipamide.

36. A composition according to claim 32 wherein said polyamide matrix resin is polycaprolactam.

37. A composition according to Claim 33 wherein said polyamide matrix resin is polycaprolactam.

38. A composition according to claim 4 wherein said at least one polymer is a random copolymer consisting essentially of polymerized ethylene, alkyl acrylate selected from methyl and ethyl acrylate, and from about 0.0025–0.077 mole/100 g. polymer of a mono alkyl ester of 1,4-butene-dioic acid in which the alkyl group of the ester has 1 to 6 carbon atoms, said copolymer having from about 0.64–0.80 mole of (-CO$_2$-) units per 100 grams of copolymer, and having 0 to 100 percent of the esters of 1,4-butene-dioic acid ionized by neutralization with metal ions selected from lithium, sodium, potassium, calcium and zinc ions, said copolymer having a melt index at 190° C. and a total load of 2160 grams of about 0.3 to 100 grams/10 minutes, and when neutralized having a melt flow rate of 0.04 to 100 grams/10 minutes under condition G of ASTM D 1238.

39. A composition according to claim 38 wherein said mono alkyl ester of 1,4-butene-dioic acid consists essentially of ethyl hydrogen maleate.

40. A composition according to claim 39 wherein said polyamide matrix resin is polyhexamethylene adipamide.

41. A composition according to claim 39 wherein said polyamide matrix resin is polycaprolactam.

42. A process according to claim 41 wherein said at least one polymer is taken from the class consisting of branched and straight chain polymers.

43. A process according to claim 42 wherein the tensile modulus of said at least one polymer is about 5.0 to 20,000 p.s.i. and the ratio of tensile modulus is greater than 20 to 1.

44. A process according to claim 43 wherein said at least one polymer is present as part of a mixture.

45. A process for the preparation of a toughened multi-phase thermoplastic composition which comprises, in a closed system, (a) admixing (1) 60 to 99 percent by weight of a polyamide matrix resin of number average molecular weight of at least 5000, and (2) 1 to 40 percent by weight of at least one polymer at a temperature in the range of about 5° to 100° C. above the melting point of said polyamide matrix resin and (b) shearing to disperse said at least one polymer in said matrix to contain particles in the range of 0.01 to 1.0 microns, said at least one polymer having sites which adhere to said matrix, and having a tensile modulus in the range of 1.0 to 20,000 p.s.i., the ratio of the tensile modulus of said matrix to tensile modulus of said at least one polymer being greater than 10 to 1 wherein said at least one polymer comprises at least 20 percent by weight of said at least one other phase and is represented by the formula:

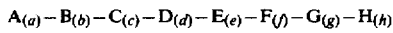

derived in any order from monomers A to H wherein

A is ethylene;

B is CO;

C is an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;

D is an unsaturated epoxide of 4 to 11 carbon atoms;

E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

F is an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms;

G is an unsaturated monomer having at least one substituent selected from the group consisting of pendant hydrocarbon chains of 1 to 12 carbon atoms and pendant aromatic groups which may have 1 to 6 substituent groups having a total of 14 carbon atoms; and H is an unsaturated monomer taken from the class consisting of branched, straight chain and cyclic compounds having from 4 to 14 carbon atoms and at least one additional unsaturated carbon-carbon bond capable of being grafted with a monomer having at least one reactive group of the type defined in C, D and E;

monomers A to H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

46. A process according to claim 45 wherein the notched Izod in the dry as molded condition is at least the values represented by the formulae:

$B + 0.2\, C_1$ $B + 2.0 + 0.5\, (C_2 - 10)$ $B + 12.0$ where B is the notched Izod of the polyamide matrix resin, $C_1$ is 2 to 10 percent by weight of the at least one polymer, and $C_2$ is 10 to 30 percent by weight of the at least one polymer, and the notched Izod is at least $B + 12.0$ when the concentration of the at least one polymer is between 30 and 40 percent by weight.

47. A process according to claim 45 wherein said at least one polymer consists essentially of polymerized ethylene, at least one polymerized $\alpha$-olefin of 3 to 6 carbon atoms, and at least one polymerized unsaturated monomer taken from the class consisting of branched, straight chain and cyclic compounds having from 4 to 14 carbon atoms and at least one additional nonconjugated unsaturated carbon-carbon bond, and grafted thereto an unsaturated monomer taken from the class consisting of $\alpha,\beta$-ethylenically unsaturated dicarboxylic acids having from 3 to 8 carbon atoms, and derivatives thereof taken from the class consisting of monoesters of alcohols of 1 to 29 carbon atoms, anhydrides of the dicarboxylic acids, the metal salts of the dicarboxylic acids and the monoesters of said dicarboxylic acid having from 0 to 100 percent of the carboxylic groups ionized by neutralization with metal ions.

48. A process according to claim 45 wherein said at least one polymer is a random copolymer 45 consisting essentially of polymerized ethylene, alkyl acrylate selected from methyl and ethyl acrylate, and from about 0.0025–0.077 mole/100 g. polymers of a mono alkyl ester of 1,4-butene-dioic acid in which the alkyl group of the ester has 1 to 6 carbon atoms, said copolymer having from about 0.64–0.80 mole of ($-CO_2-$) units per 100 grams of copolymer, and having 0 to 100 percent of the esters of 1,4-butene-dioic acid ionized by neutralization with metal ions selected from lithium, sodium, potassium, calcium and zinc ions, said copolymer having a melt index at 190° C. and a total load of 2160 grams of about 0.3 to 100 grams/10 minutes, and when neutralized having a melt flow rate of 0.04 to 100 grams/10 minutes under condition G of ASTM D 1238.

49. Process for preparing a toughened multiphase thermoplastic composition consisting essentially of one phase containing 80 to 99 percent by weight of a polyamide matrix resin of number average molecular weight of at least 5000, and 1 to 20 percent by weight of at least one other phase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 p.s.i., the ratio of the tensile modulus of the polyamide matrix resin to tensile modulus of said at least one polymer being greater than 10 to 1, which comprises initially admixing said polyamide matrix resin and up to about 40 percent by weight of the said at least one polymer and additionally admixing said polyamide matrix resin until said desired concentration is achieved and wherein said at least one polymer comprises at least 20 percent by weight of said at least one other phase and is represented by the formula:

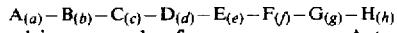

derived in any order from monomers A to H wherein
A is ethylene;
B is CO; C is an unsaturated monomer taken from the class consisting of α,β-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;
D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;
F is an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms;
G is an unsaturated monomer having at least one substituent selected from the group consisting of pendant hydrocarbon chains of 1 to 12 carbon atoms and pendant aromatic groups which may have 1 to 6 substituent groups having a total of 14 carbon atoms; and
H is an unsaturated monomer taken from the class consisting of branched, straight chain and cyclic compounds having from 4 to 14 carbon atoms and at least one additional unsaturated carbon-carbon bond capable of being grafted with a monomer having at least one reactive group of the type defined in C, D and E;
monomers A to H being present in the following mole fraction:
(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

50. A process according to claim 45 wherein said composition prepared using a polyamide matrix resin having an initial number average molecular weight of 5,000 to 15,000 is held at a temperature about 10° to 40° C. above the melting point of said polyamide matrix resin for up to one hour at a pressure of about 1 to 25 mm Hg absolute.

51. A process according to claim 45 wherein said composition prepared using a polyamide matrix resin having an initial number average molecular weight of 5,000 to 15,000 is extruded through a die into the form of beading, cut, quenched, dried and is held at an elevated temperature at least 15° C. below the melting point of said polyamide matrix resin for at least two hours in a stream of inert gas.

52. A composition according to claim 1 in the form of a film.

53. A toughened multiphase thermoplastic composition consisting essentially of one phase containing 60 to 99 percent by weight of a polyamide matrix resin of number average molecular weight of at least 5,000, and 1 to 40 percent by weight of at least one other hase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 psi, the ratio of the tensile modulus of the polyamide matrix resin to tensile modulus of said at least one polymer being greater than 10:1 wherein said at least one polymer comprises at least 20 percent by weight of said at least one other phase and is represented by the formula:

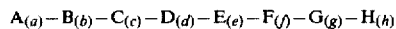

derived in any order from monomers A to H wherein
A is ethylene;
B is CO;
C is an unsaturated monomer taken from the class consisting of methacrylic acid having from 0 to 100 percent of the carboxylic acid groups neutralized with metal ions selected from zinc and calcium; ethyl hydrogen maleate having from 0 to 100 percent of the carboxylic acid groups neutralized with metal ions selected from zinc, lithium, potassium, sodium, calcium and antimony; ethyl hydrogen maleate having from 0 to 100 percent of the carboxylic acid groups neutralized with zinc rosinate or potassium stearate; acrylic acid; maleic anhydride having from 0 to 100 percent of the carboxylic acid groups neutralized with zinc ions; fumaric acid; butyl hydrogen maleate; ethyl hydrogen fumarate; 3,6-endomethylene, 1,2,3,6-tetrahydrophthalic anhydride;
D is glycidyl methacrylate;
E is an azide selected from the group consisting of benzoic acid sulfonyl azide, phthalic anhydride sulfonyl azide, the monoethyl ester of phthalic anhydride sulfonyl azide and the mono-octadecylester of phthalic anhydride sulfonyl azide;
F is an unsaturated monomer taken from the class consisting of isobutylacrylate, methyl acrylate, vinyl acetate, methylmethacrylate, n-butylacrylate, 2-ethyl hexyl methacrylate, methyl vinyl ether, ethyl acrylate and acrylonitrile;

G is an unsaturated monomer taken from the class consisting of propylene, styrene, and isobutylene;

H is an unsaturated monomer taken from the class consisting of 1,4-hexadiene, 2,5-norbornadiene, butadiene, and isoprene;

monomers A through H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

54. A process for the preparation of a toughened multiphase thermoplastic composition which comprises, in a closed system, (a) admixing (1) 60 to 99 percent by weight of a polyamide matrix resin of number average molecular weight of at least 5000, and (2) 1 to 40 percent by weight of at least one polymer at a temperature in the range of about 5° to 100° C. above the melting point of said polyamide matrix resin and (b) shearing to disperse said at least one polymer in said matrix to contain particles in the range of 0.01 to 1.0 microns, said at least one polymer having sites which adhere to said matrix, and having a tensile modulus in the range of 1.0 to 20,000 p.s.i., the ratio of the tensile modulus of said matrix to tensile modulus of said at least one polymer being greater than 10 to 1 wherein said at least one polymer comprises at least 20 percent by weight of said at least one other phase and is represented by the formula:

$$A_{(a)} - B_{(b)} - C_{(c)} - D_{(d)} - E_{(e)} - F_{(f)} - G_{(g)} - H_{(h)}$$

derived in any order from monomers A to H wherein

A is ethylene;

B is CO;

C is an unsaturated monomer taken from the class consisting of methacrylic acid having from 0 to 100 percent of the carboxylic acid groups neutralized wiith metal ions selected from zinc and calcium; ethyl hydrogen maleate having from 0 to 100 percent of the carboxylic acid groups. neutralized with metal ions selected from zinc, lithium, potassium, sodium, calcium and antimony; ethyl hydrogen maleate having from 0 to 100 percent of the carboxylic acid groups neutralized with zinc rosinate or potassium stearate; acrylic cid; maleic anhydride having from 0 to 100 percent of the carboxylic acid groups neutralized wih zinc ions; fumaric acid; butyl hydrogen maleate; ethyl hydrogen fumarate; 3,6-endomethylene,, 1,2,3,6-tetrahydrophthalic anhydride;

D is glycidyl methacrylate;

E is an azide selected from the group consisting of benzoic acid sulfonyl azide, phthalic anhydride sulfonyl azide, the monoethyl ester of phthalic anhydride sulfonyl azide and the mono-octadecylester of phthalic anhydride sulfonyl azide;

F is an unsaturated monomer taken from the class consisting of isobutylacrylate, methyl acrylate, vinyl acetate, methylmethacrylate, n-butylacrylate, 2-ethyl hexyl methacrylate, methyl vinyl ether, ethyl acrylate and acrylonitrile;

G is an unsaturated monomer taken from the class consisting of propylene, styrene, and isobutylene;

H is an unsaturated monomer taken from the class consisting of 1,5-hexadiene, 2,5-norbornadiene, butadiene and isoprene;

monomers A to H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

55. A process for preparing a toughened multiphase thermoplastic composition consisting essentially of one phase containing 80 to 99 percent by weight of a polyamide matrix resin of number average molecular weight of at least 5,000, and 1 to 20 percent by weight of at least one other phase containing particles of at least one polymer taken from the class consisting of branched and straight chain polymers having a particle size in the range of 0.01 to 1.0 microns and having sites which adhere to the polyamide matrix resin, and said at least one polymer having a tensile modulus in the range of about 1.0 to 20,000 psi, the ratio of the tensile modulus of the polyamide matrix resin to tensile modulus of said at least one polymer being greater than 10 to 1, which comprises admixing said polyamide matrix resin and up to about 40 percent by weight of the said at least one polymer and additionally admixing said polyamide matrix resin until the desired concentration of 80 to 99 percent by weight is achieved and wherein said at least one polymer comprises at least 20 percent by weight of said at least one other phase and is represented by the formula:

$$A_{(a)} - B_{(b)} - C_{(c)} - D_{(d)} - E_{(e)} - F_{(f)} - G_{(g)} - H_{(h)}$$

derived in any order from monomers A to H wherein

A is ethylene;

B is CO;

C is an unsaturated monomer taken from the class consisting of methacrylic acid having from 0 to 100 percent of the carboxylic acid groups neutralized with metal ions selected from zinc and calcium; ethyl hydrogen maleate having from 0 to 100 percent of the carboxylic acid groups neutralized with metal ions selected from zinc, lithium, potassium, sodium, calcium and antimony; ethyl hydrogen maleate having from 0 to 100 percent of the carboxylic acid groups neutralized with zinc rosinate or potassium stearate; acrylic acid; maleic anhydride having from 0 to 100 percent of the carboxylic acid groups neutralized with zinc ions; fumaric acid; butyl hydrogen maleate; ethyl hydrogen fumarate; 3,6-endomethylene, 1,2,3,6-tetrahydrophthalic anhydride;

D is glycidyl methacrylate;

E is an azide selected from the group consisting of benzoic acid sulfonyl azide, phthalic anhydride sulfonyl azide, the monoethyl ester of phthalic anhydride sulfonyl azide and the mono-octadecylester of phthalic anhydride sulfonyl azide;

F is an unsaturated monomer taken from the class consisting of isobutylacrylate, methyl acrylate, vinyl acetate, methylmethacrylate, n-butylacrylate, 2-ethyl hexyl methacrylate, methyl vinyl ether, ethyl acrylate and acrylonitrile;

G is an unsaturated monomer taken from the class consisting of propylene, styrene, and isobutylene;

H is an unsaturated monomer taken from the class consisting of 1,5-hexadiene, 2,5-norbornadiene, butadiene and isoprene;

monomers A to H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present, and further provided that when said at least one polymer is present as part of a mixture, that the components of the mixture co-exist in the same discrete particles in the polyamide matrix.

* * * * *